(12) United States Patent
Tanaka et al.

(10) Patent No.: US 9,340,625 B2
(45) Date of Patent: May 17, 2016

(54) CELLULOSE RESIN

(75) Inventors: Shukichi Tanaka, Tokyo (JP);
Masatoshi Iji, Tokyo (JP); Sungil Moon, Tokyo (JP)

(73) Assignee: NEC CORPORATION, Tokyo (JP)

( * ) Notice: Subject to any disclaimer, the term of this patent is extended or adjusted under 35 U.S.C. 154(b) by 462 days.

(21) Appl. No.: 13/813,610

(22) PCT Filed: Jul. 6, 2011

(86) PCT No.: PCT/JP2011/065450
§ 371 (c)(1),
(2), (4) Date: Aug. 6, 2013

(87) PCT Pub. No.: WO2012/017772
PCT Pub. Date: Feb. 9, 2012

(65) Prior Publication Data
US 2013/0310519 A1 Nov. 21, 2013

(30) Foreign Application Priority Data
Aug. 6, 2010 (JP) .................................. 2010-177953

(51) Int. Cl.
| C08B 15/00 | (2006.01) |
| C08L 1/08 | (2006.01) |
| C08B 15/05 | (2006.01) |
| C08B 3/22 | (2006.01) |
| C08G 18/76 | (2006.01) |
| C08G 18/42 | (2006.01) |
| C08G 18/10 | (2006.01) |
| C08F 251/02 | (2006.01) |

(52) U.S. Cl.
CPC . *C08B 15/05* (2013.01); *C08B 3/22* (2013.01); *C08B 15/00* (2013.01); *C08G 18/10* (2013.01); *C08G 18/4238* (2013.01); *C08G 18/7671* (2013.01); *C08L 1/08* (2013.01); *C08F 251/02* (2013.01)

(58) Field of Classification Search
CPC ........ C08B 15/00; C08B 15/05; C08G 81/00; C08G 81/02; C08G 18/10; C08L 1/02; C08L 1/08; C08J 2301/02; C08J 2301/08; C08F 251/02
USPC .................. 525/54.21, 54.22, 54.23
See application file for complete search history.

(56) References Cited

U.S. PATENT DOCUMENTS

| 2,290,861 A | 7/1942 | Campbell |
| 2,551,282 A | 5/1951 | Palmer et al. |
| 4,663,159 A | 5/1987 | Brode, II et al. |
| 5,124,445 A | 6/1992 | Just et al. |
| 5,504,123 A * | 4/1996 | Partan, III ............. C08B 11/187 524/42 |
| 2008/0275204 A1 | 11/2008 | Dai et al. |
| 2008/0312399 A1 | 12/2008 | Dai et al. |
| 2011/0065832 A1 | 3/2011 | Dai et al. |
| 2011/0065882 A1 | 3/2011 | Dai et al. |
| 2011/0065883 A1 | 3/2011 | Dai et al. |
| 2011/0065947 A1 | 3/2011 | Dai et al. |
| 2011/0118495 A1 | 5/2011 | Dai et al. |
| 2012/0202926 A1* | 8/2012 | Iji ............................ C08B 3/10 524/41 |

FOREIGN PATENT DOCUMENTS

| CN | 101688016 A | 3/2010 |
| JP | 6-248002 A | 9/1994 |
| JP | 8-231918 A | 9/1996 |
| JP | 10-8035 A | 1/1998 |
| JP | 11-71402 A | 3/1999 |
| JP | 11-255801 A | 9/1999 |
| JP | 11-269797 A | 10/1999 |
| JP | 2001-32869 A | 2/2001 |
| WO | 2007/086318 A1 | 8/2007 |
| WO | 2007/099769 A1 | 9/2007 |
| WO | 2007/129722 A1 | 11/2007 |
| WO | 2011-043279 A1 | 4/2011 |

OTHER PUBLICATIONS

Office Action dated Jun. 4, 2014, issued by the State of Intellectual Property Office of the People's Republic of China in corresponding application No. 201180036655.9.
Emmett M Partain: "The Synthesis of Hydrophobe-Modified Hydroxyethyl Cellulose Polymers using 3-n-Pentadecenyl Phenyl Glycidyl Ether", Polymer Preprints, American Chemical Society, US, vol. 39, No. 2, Jan. 1, 1998, pp. 82-83.
Search Report dated Nov. 26, 2013, issued by the European Patent Office in counterpart European Application No. 11814402.1.
George John et al., "Grafting of bio-monomers", Polymer Bulletin 1989, pp. 89-94, vol. 22.
International Search Report for PCT/JP2011/065450 dated Aug. 16, 2011.
"DP finish of cotton fabric with polyurethane modified silicone", Xiong Lei et al., Dyeing and Finishing, 2008, vol. 3, pp. 5-8.
Communication dated Feb. 17, 2015, issued by the State Intellectual Property Office of P.R. China in counterpart Chinese application No. 201180036655.9.
Tyman et al., "The separation and synthesis of lipidic 1,2- and 1,3-diols from natural phenolic lipids for the complexation and recovery of boron," Chemistry and Physics of Lipids, 2003, vol. 126, pp. 177-199 (23 pages total).

\* cited by examiner

*Primary Examiner* — Roberto Rabago
(74) *Attorney, Agent, or Firm* — Sughrue Mion, PLLC

(57) ABSTRACT

A cellulose resin produced by binding cardanol or a derivative thereof, and a flexible component to cellulose or a derivative thereof.

24 Claims, No Drawings

CELLULOSE RESIN

TECHNICAL FIELD

The present invention relates to a cellulose resin.

BACKGROUND ART

Bioplastic using a plant as a raw material can contribute to a countermeasure against petroleum depletion and global warming, and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As bioplastic using a non-edible part as a raw material, various types of bioplastics using cellulose, which is a main component of non-edible parts of wood and plant, have been already developed and commercialized.

Cellulose is a high molecular weight compound formed by polymerization of β-glucose. Since cellulose has high crystallinity, it is hard, fragile and absent of thermoplasticity. In addition, since cellulose contains many hydroxy groups, water absorbability is high and water resistance is low. Then, various investigations have been made to improve the properties of cellulose.

For example, Patent Literature 1 (JP11-255801A) discloses a biodegradable graft polymer having thermoplasticity obtained by ring-opening graft polymerization of cellulose acetate having a hydroxy group with ε-caprolactone.

Meanwhile, a material using a non-edible component other than cellulose has been developed. For example, cardanol derived from cashew nutshell, since it has stable amount of production and excellent functionality ascribed to its characteristic molecular structure, has found various applications.

As an example of using cardanol, Patent Literature 2 (JP10-8035A) discloses a friction material for brake, which is formed of a fiber base material made of an aramid pulp and a cellulose fiber, and a filler made of calcium carbonate and cashew dust, with the use of a binder made of a phenol resin. Patent Literature 3 (JP2001-32869A) discloses a friction material formed of a base material made of an aramid fiber and a cellulose fiber, and a filler made of graphite and cashew dust, with the use of an organic-inorganic composite binder. It is described that the friction material is applied to clutch facing of a power transmission system of automobiles etc.

In Non Patent Literature 1 (George John et al., Polymer Bulletin, 22, p. 89-94 (1989)), it is described that water resistance of paper can be improved by soaking a paper sheet in cardanol to perform a grafting reaction through which cardanol binds to cellulose constituting the paper sheet. It is described that, in the grafting reaction, a terminal double bond of cardanol binds to a hydroxy group of cellulose in the presence of boron trifluoride diethyl ether ($BF_3$—$OEt_2$).

CITATION LIST

Patent Literature

Patent Literature 1: JP11-255801A
Patent Literature 2: JP10-8035A
Patent Literature 3: JP2001-32869A

Non Patent Literature

Non Patent Literature 1: George John et al., Polymer Bulletin, 22, p. 89-94 (1989)

SUMMARY OF INVENTION

Technical Problem

Cellulose bioplastic, whose properties are influenced by inherent properties of cellulose, is insufficient in strength, heat resistance, water resistance, thermoplasticity and impact resistance. These properties need to be improved particularly when cellulose bioplastic is applied to durable products such as packaging for electronic devices.

Cellulose bioplastic has another problem. When a plasticizer is added in order to improve thermoplasticity, heat resistance and strength (in particular, rigidity) decrease, and also decrease in uniformity and bleed out of a plasticizer (a plasticizer bleeds out in the surface of a molded product) occur. Furthermore, when a plasticizer formed of a petroleum feedstock is added in a large amount, the utilization ratio of plants (vegetism) decreases. Furthermore, if a general flexible component is added to improve impact resistance, the flexible component bleeds out during a molding process and may affect moldability.

An object of the present invention is to provide a cellulose resin having improved impact resistance as well as thermoplasticity, heat resistance, strength, moldability and water resistance.

Solution to Problem

According to an exemplary aspect of the present invention, there is provided a cellulose resin produced by binding cardanol or a derivative thereof, and a flexible component to cellulose or a derivative thereof.

According to another exemplary aspect of the present invention, there is provided a resin composition including the above cellulose resin as a base resin.

According to another exemplary aspect of the present invention, there is provided a molding material including the above resin composition.

Advantageous Effects of Invention

According to an exemplary embodiment of the present invention, it is possible to provide a cellulose resin having improved impact resistance as well as thermoplasticity, heat resistance, strength and water resistance.

DESCRIPTION OF EMBODIMENTS

A cellulose resin in accordance with an exemplary embodiment of the present invention is obtained by chemically binding (hereinafter referred to as "grafting") cardanol or a derivative thereof (hereinafter referred to as "cardanol component"), and a flexible component to cellulose (or a derivative thereof).

Owing to a grafting of a cardanol component to cellulose (or a derivative thereof), mechanical characteristics (particularly toughness) and water resistance can be improved. Furthermore, since good thermoplasticity is provided by the grafting, the amount of plasticizer to be added can be reduced or a plasticizer may not be added. As a result, heat resistance and strength (particularly rigidity) can be suppressed from reducing compared to the cellulose resin containing a plasticizer, and homogeneity of the resultant resin can be improved. In addition, a problem of bleed out can be overcome. Furthermore, since the addition amount of plasticizer made of a petroleum feedstock can be lowered or reduced to zero, vegetism can be enhanced. In addition, since cellulose and cardanol are both derived from non-edible parts of plants, the utilization ratio of non-edible parts can be increased.

Impact resistance is improved by grafting not only a cardanol component but also a flexible component to cellulose (or a derivative thereof). Furthermore, since the flexible component is chemically bound to cellulose (or a derivative thereof), the bleed out of the flexible component can be suppressed.

[Cellulose or a Derivative Thereof]

First, cellulose (or a derivative thereof) before grafting will be described in detail.

Cellulose is a straight-chain polymer of β-glucose, represented by the following formula (1) and each glucose unit has three hydroxy groups. Using these hydroxy groups, a cardanol component can be grafted.

[Formula 1]

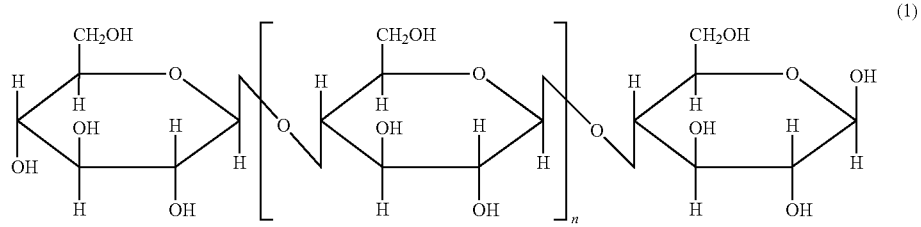

(1)

Cellulose is a main component of plants and can be obtained by a separation treatment for removing other components such as lignin from the plants. Other than the cellulose thus obtained, cellulose obtained by purification of cotton or pulp rich in cellulose content can be used, or the cotton or pulp can be directly used.

The polymerization degree of cellulose (or a derivative thereof) preferably falls within the range of 50 to 5000 and more preferably 100 to 3000 in terms of glucose polymerization degree. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose (or a derivative thereof) may be mixed with chitin and chitosan having an analogous structure. When cellulose is mixed with them, the amount thereof is preferably 30% by mass or less relative to the total amount of mixture, preferably 20% by mass or less and further preferably 10% by mass or less.

A cellulose derivative herein refers to cellulose having hydroxy groups partly acylated, etherified or grafted. Specific examples thereof include organic acid esters such as cellulose acetate, cellulose butyrate and cellulose propionate; inorganic acid esters such as cellulose nitrate, cellulose sulfate and cellulose phosphate; mixed esters such as cellulose acetate propionate, cellulose acetate butyrate, cellulose acetate phthalate and cellulose acetate nitrate; and etherified cellulose such as methylcellulose, hydroxyethylcellulose and hydroxypropylcellulose. Furthermore, celluloses grafted with styrene, (meth)acrylic acid, (meth)acrylate, ϵ-caprolactone, lactide, glycolide, etc. are included. These acylated cellulose, etherified cellulose and grafted cellulose may be used singly or in combination of two or more types.

As the cellulose (or a derivative thereof) of the exemplary embodiment, for example, at least one acylated cellulose selected from a cellulose acetate, cellulose propionate and cellulose butyrate, which have hydroxy groups partially acylated, can be preferably used.

The term "cellulose derivative" used herein includes both a cellulose compound, and a compound having a cellulose skeleton, obtained by biologically or chemically introducing a functional group into raw-material cellulose.

[Grafting of Cardanol Component]

Next, grafting of a cardanol component to cellulose (or a derivative thereof) will be described in detail.

Cardanol is a component contained in the shell of cashew nut, and is an organic compound represented by the following formula (2), which has a phenol moiety and a straight-chain hydrocarbon moiety. There are 4 types of cardanols different in the number of unsaturated bonds in the straight-chain hydrocarbon moiety R. Usually, cardanol is a mixture of these 4 components. To be more specific, cardanol is a mixture of 3-pentadecylphenol, 3-pentadecylphenol monoene, 3-pentadecylphenol diene and 3-pentadecylphenol triene, described in the following formula (2). A cardanol component obtained by extracting and purifying from a cashew nutshell liquid can be used.

[Formula 2]

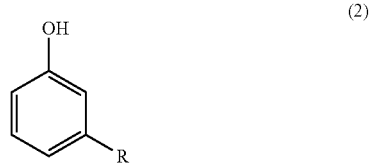

(2)

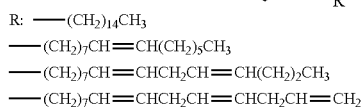

The straight-chain hydrocarbon moiety of cardanol contributes to improving flexibility and hydrophobicity of a resin, whereas the phenol moiety has a highly reactive phenolic hydroxy group for use in grafting. When such a cardanol component is grafted to cellulose (or a derivative thereof), a cellulose structure to which a cardanol component is added like bristles is formed. As a result, cardanol bristles thus grafted interact with each other to improve mechanical characteristics (particularly toughness), as well as to impart thermoplasticity. In addition, owing to hydrophobicity of cardanol, water resistance can be improved.

Grafting can be performed through a binding reaction by dehydration between the phenolic hydroxy group of a cardanol component and a hydroxy group of cellulose (or a derivative thereof). At this time, a dehydration catalyst such as sulfuric acid, toluene sulfonic acid and hydrogen chloride can be added. As a result, a cellulose carbon atom to which a hydroxy group of cellulose (or a derivative thereof) is bound and a cardanol carbon atom to which the phenolic hydroxy group of a cardanol component is bound are linked via an oxygen atom.

Also, grafting can be performed by use of a multifunctional compound capable of reacting with a hydroxy group and the phenolic hydroxy group of cardanol. As a result, a cellulose carbon atom to which a hydroxy group of cellulose (or a derivative thereof) is bound and a cardanol carbon atom to which the phenolic hydroxy group of a cardanol component is bound are linked via an organic linking group. According to such grafting, efficiency of a grafting reaction can be improved and a side reaction can be suppressed.

The organic linking group may have a first bond binding to the cellulose carbon atom, the bond being selected from an ester bond, an ether bond and a urethane bond, and a second bond binding to the cardanol carbon atom, the bond being selected from an ester bond, an ether bond and a urethane bond.

For example, this multifunctional compound and cardanol are bound by use of the phenolic hydroxy group of cardanol and one of the functional groups of the multifunctional compound to obtain a cardanol derivative. The resultant cardanol derivative and cellulose (or a derivative thereof) can be bound by use of a hydroxy group of cellulose (or a derivative thereof) and the functional group (the functional group derived from the multifunctional compound) of the cardanol derivative.

According to the aforementioned grafting, the hydroxy group of cellulose (or a derivative thereof) and the phenolic hydroxy group of a cardanol component are eliminated to form a graft bond; at the same time, the hydrophobic structure of cardanol can be introduced into cellulose (or a derivative thereof) to improve water resistance.

To graft a cardanol component to cellulose (or a derivative thereof), the phenolic hydroxy group of cardanol and a hydroxy group of cellulose are preferably used as mentioned above in view of efficiency of a grafting reaction, resultant molecular structure and water resistance. Since such grafting is made by use of a highly-reactive phenolic hydroxy group, more efficient grafting can be realized compared to grafting using an unsaturated bond (double bond) of the straight-chain hydrocarbon moiety of cardanol. Furthermore, according to the grafting of the exemplary embodiment, since the phenol moiety of cardanol reacts with cellulose and fixed to it, mutual interaction between straight-chain hydrocarbon moieties of the grafted cardanol molecules enhances, and thus a desired effect of improving mechanical characteristics can be obtained. Furthermore, in the exemplary embodiment, since grafting is performed by eliminating the phenolic hydroxy group of cardanol, water resistance can be improved (suppressing water absorbability) compared to grafting that does not use a phenolic hydroxy group. Also from this point of view, the grafting of the exemplary embodiment is advantageous.

The aforementioned multifunctional compounds and organic linking groups preferably include a hydrocarbon group. The number of carbon atoms of the hydrocarbon group is preferably 1 or more and more preferably 2 or more, and also preferably 20 or less, more preferably 14 or less and further preferably 8 or less. If the number of carbon atoms is excessively large, the molecule becomes excessively large and thus reactivity reduces. As a result, it is often difficult to increase a grafting rate. As such a hydrocarbon group, a divalent group is preferable. Examples thereof include a divalent straight-chain aliphatic hydrocarbon groups (particularly, straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring group, a cyclohexane ring group, a cyclooctane ring group, a bicyclopentane ring group, a tricyclohexane ring group, a bicyclooctane ring group, a bicyclononane ring group and a tricyclodecane ring group; divalent aromatic hydrocarbon groups such as a benzene ring group, a naphthalene ring group and a biphenylene group; and divalent groups composed of combinations of these.

When the hydrocarbon group as mentioned above is an aromatic hydrocarbon group or an alicyclic hydrocarbon group, because of its stiffness, the rigidity of the resultant resin can be improved. In contrast, when the hydrocarbon group is a straight-chain aliphatic hydrocarbon group, because of its flexibility, the toughness of the resultant resin can be improved.

As a functional group of a multifunctional compound as mentioned above, a group selected from a carboxyl group, a carboxylic acid anhydride group, a carboxylic halide group (particularly, carboxylic chloride group), an epoxy group, an isocyanate group and a halogen group is preferred. Of them, a carboxyl group, a carboxylic acid anhydride group, a halogen group (particularly, a chloride group) and an isocyanate group are preferred. As the functional group to be reacted with the phenolic hydroxy group of cardanol, particularly, a carboxylic acid anhydride group, a halogen group (particularly, chloride group) and an isocyanate group are preferred. As the functional group to be reacted with a hydroxy group of cellulose, particularly, a carboxylic halide group (particularly, a carboxylic chloride group) and an isocyanate group are preferred. The carboxylic halide group can be formed by converting a carboxyl group into an acid halide group before grafting.

Specific examples of such a multifunctional compound include dicarboxylic acid, carboxylic acid anhydride, dicarboxylic acid halide, monochlorocarboxylic acid, and diisocyanates. Examples of the dicarboxylic acid include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic acid anhydride include anhydrides of these dicarboxylic acids. Examples of the dicarboxylic acid halide include acid halides of these dicarboxylic acids. Examples of the monochlorocarboxylic acid include monochloroacetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatemethyloctane, lysine ester triisocyanate, 1,3,6-hexamethylene triisocyanate, bicycloheptane triisocyanate and dicyclohexylmethane diisocyanate (HMDI: hydrogenated MDI). Of these, tolylene diisocyanate (TDI), 4,4'-diphenylmethane diisocyanate (MDI) and 1,6-hexamethylene diisocyanate (HDI) can be preferably used.

One of the functional groups of a multifunctional compound as mentioned above and the phenolic hydroxy group of cardanol are reacted to form a cardanol derivative, and then, the cardanol derivative is bound to cellulose (or a derivative thereof) by use of a hydroxy group of cellulose (or a derivative thereof) and the functional group (derived from the multifunctional compound) of the cardanol derivative.

For example, a carboxylic acid-based multifunctional compound (dicarboxylic acid, carboxylic acid anhydride or monochloro carboxylic acid) is reacted with cardanol, the phenolic hydroxy group of the cardanol and a functional group of the multifunctional compound (carboxyl group, carboxylic acid anhydride group or halogen group (particularly, chloride group)) are reacted to form a cardanol derivative, and the remaining functional group (carboxyl group) is converted into a carboxylic halide group (particularly, carboxylic chloride group). The cardanol derivative is reacted with cellulose (or a derivative thereof) to react a hydroxy group of the cellulose (or a derivative thereof) with the carboxylic halide group of the cardanol derivative. In this way, grafting can be performed. In this case, grafting can be extremely efficiently performed.

As a result of grafting using a multifunctional compound, the cellulose carbon atom to which a hydroxy group of cellulose (or a derivative thereof) is bound and the hydrocarbon group of a multifunctional compound are allowed to bind, for example, via an ester bond, an ether bond or a urethane bond, preferably via an ester bond; whereas the cardanol carbon atom to which the phenolic hydroxy group of a cardanol component is bound and the hydrocarbon group of the multifunctional compound are allowed to bind, for example, via an ester bond, an ether bond or a urethane bond, preferably via an ester bond or an ether bond.

An unsaturated bond(s) (double bond) of the straight-chain hydrocarbon moiety of the cardanol are preferably hydrogenated and converted into a saturation bond. The conversion rate (hydrogenation rate) of the unsaturated bonds by hydrogenation is preferably 90% by mole or more and more preferably 95% by mole or more. After hydrogenation, the residual ratio (the number of unsaturated bonds per cardanol molecule) of unsaturated bonds of the cardanol is preferably 0.2 (bond/molecule) or less and more preferably 0.1 (bond/molecule) or less.

When a cardanol component, in which a large number of unsaturated bonds of the straight-chain hydrocarbon moiety still remain, is grafted to cellulose (or a derivative thereof), a side reaction likely to occur, with the result that grafting cannot be efficiently performed and the solubility of a grafted product in a solvent may often significantly reduce. When a cardanol derivative in which an unsaturated bond(s) of the straight-chain hydrocarbon moiety are sufficiently converted into saturated bonds by hydrogenation, is grafted, grafting can be efficiently performed while suppressing a side reaction and in addition, solubility reduction of a grafted product in a solvent can be suppressed.

The hydrogenation method is not particularly limited and a method known in the art can be used. Examples of the catalyst include a noble metal such as palladium, ruthenium and rhodium, nickel, and a substance made by immobilizing a metal selected from these on a carrier such as activated carbon, activated alumina and diatom earth. As the reaction system, a batch system in which a reaction is performed while suspending and stirring a powdery catalyst and a continuous system using a reaction tower charged with a molded catalyst can be employed. The solvent for hydrogenation may not be used depending upon the system of hydrogenation. However, when a solvent is used, examples of the solvent include alcohols, ethers, esters and saturated hydrocarbons generally. The reaction temperature for hydrogenation is not particularly limited; however, it can be usually set to 20 to 250° C. and preferably 50 to 200° C. If the reaction temperature is excessively low, a hydrogenation rate becomes low. Conversely, if the reaction temperature is excessively high, the amount of decomposition product may increase. The hydrogen pressure during the hydrogenation can be usually set to 10 to 80 kgf/cm² ($9.8 \times 10^5$ to $78.4 \times 10^5$ Pa) and preferably 20 to 50 kgf/cm² ($19.6 \times 10^5$ to $49.0 \times 10^5$ Pa).

Hydrogenation can be performed before the cardanol derivative is formed, after the cardanol derivative is formed and before the cardanol derivative is grafted, or after the cardanol derivative is grafted; however, in view of the reaction efficiency of hydrogenation and grafting reaction, hydrogenation is preferably performed before the cardanol derivative is grafted and further preferably before the cardanol derivative is formed.

The ratio (grafting rate) of a cardanol component bound to cellulose (or a derivative thereof) relative to the cellulose (or a derivative thereof) is represented by the number (average value) of a cardanol component to be added per glucose unit of cellulose (or a derivative thereof), in other words, the number (average value) of hydroxy groups bound to a cardanol component per glucose unit of cellulose (or a derivative thereof) (the degree of substitution of the hydroxy group, $DS_{CD}$). $DS_{CD}$ is preferably 0.1 or more, and more preferably 0.2 or more. $DS_{CD}$ may be set to 0.4 or more. When $DS_{CD}$ is excessively low, the effect by grafting may not be sufficiently obtained.

The maximum value of $DS_{CD}$ is theoretically "3"; however, in view of facilitating production (grafting), $DS_{CD}$ is preferably 2.5 or less, more preferably 2 or less and further preferably 1.5 or less. Furthermore, $D_{CD}$ may be 1 or less; even in this case, sufficient improvement effect can be obtained. If $DS_{CD}$ increases, tensile breaking strain (toughness) tends to increase; whereas, the maximum strength (tensile strength, bending strength) tends to decrease. Accordingly, $DS_{CD}$ is preferably set appropriately in accordance with desired properties.

A cardanol component is grafted, and further a specific reactive hydrocarbon compound may be grafted to cellulose (or a derivative thereof). Owing to this, a cellulose resin can be improved so as to have desired properties.

This reactive hydrocarbon compound is a compound having at least one functional group capable of reacting with a hydroxy group of cellulose (or a derivative thereof). Examples thereof include hydrocarbon compounds having a carboxyl group, a carboxylic halide group, or a carboxylic acid anhydride group. Specific examples thereof include at least one compound selected from monocarboxylic acids such as an aliphatic monocarboxylic acid, an aromatic monocarboxylic acid and an alicyclic monocarboxylic acid, and acid halides or acid anhydrides thereof. Examples of the aliphatic monocarboxylic acid include straight and branched (having a side chain) fatty acids. Examples of the aromatic monocarboxylic acid include an aromatic monocarboxylic acid having a carboxyl group directly bound to an aromatic ring, and an aromatic monocarboxylic acid having a carboxyl group bound to the aromatic ring via an alkylene group (for example, methylene group, ethylene group) (the acid having an aliphatic carboxylic acid group bound to the aromatic ring). Examples of the alicyclic monocarboxylic acid include an alicyclic monocarboxylic acid having a carboxyl group directly bound to an alicycle, and an alicyclic monocarboxylic acid having a carboxyl group bound to an alicycle via an alkylene group (for example, methylene group, ethylene group) (the acid having an aliphatic carboxylic acid group bound to an alicycle).

The reactive hydrocarbon compound preferably has carbon atoms within the range of 1 to 32 and more preferably within the range of 1 to 20. If the number of carbon atoms is excessively large, the size of the molecule becomes excessively large and reaction efficiency decreases due to steric hindrance. As a result, it becomes difficult to increase a grafting rate.

The reactive hydrocarbon compound is effective in improving properties in the case where it is particularly arranged so as to bury gaps in a sterical structure composed of a grafted cardanol component.

When the hydrocarbon group of the reactive hydrocarbon compound is an aromatic hydrocarbon group and an alicyclic hydrocarbon group, it efficiently works to particularly improve rigidity and heat resistance. When the hydrocarbon group is an aliphatic hydrocarbon group, it efficiently works to particularly improve toughness.

Examples of the aliphatic monocarboxylic acid to be used as the reactive hydrocarbon compound include saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; unsaturated fatty acids such as butenoic acid, pentenoic acid, hexenoic acid, octenoic acid, undecylenic acid, oleic acid, sorbic acid, linoleic acid, linolenic acid and arachidonic acid; and derivatives of these. These may further have a substituent.

Examples of the aromatic monocarboxylic acid used as the reactive hydrocarbon compound include an aromatic carboxylic acid having a carboxyl group introduced in a benzene ring such as benzoic acid; an aromatic carboxylic acid having an alkyl group introduced in a benzene ring such as toluic acid; an aromatic carboxylic acid having an aliphatic carboxylic acid group introduced in a benzene ring such as phenylacetic acid and phenyl propionic acid; an aromatic carboxylic acid having two or more benzene rings such as biphenylcarboxylic acid and biphenylacetic acid; an aromatic carboxylic acid having a condensed-ring structure such as naphthalene carboxylic acid and tetralin carboxylic acid; and derivatives of these.

Examples of the alicyclic monocarboxylic acid to be used as the reactive hydrocarbon compound include an alicyclic monocarboxylic acid having a carboxyl group introduced to an alicycle such as cyclopentane carboxylic acid, cyclohexane carboxylic acid and cyclooctane carboxylic acid; alicyclic monocarboxylic acids having an aliphatic carboxylic acid introduced in an alicycle such as cyclohexyl acetic acid; and derivatives of these.

If an organic silicon compound and an organic fluorine compound are added to these reactive hydrocarbon compound structures, properties such as water resistance can be more effectively improved.

As the reactive functional groups of these reactive hydrocarbon compounds, any reactive functional groups are used as long as they can react with a hydroxy group of cellulose. Examples thereof include a carboxyl group, a carboxylic acid halide group (particularly, a carboxylic acid chloride group), and a carboxylic acid anhydride, and further include an epoxy group, an isocyanate group and a halogen group (particularly, a chloride group). Of these, a carboxyl group and a carboxylic acid halide group are preferable and a carboxylic acid chloride group is particularly preferable. Examples of the carboxylic acid halide group (particularly, a carboxylic acid chloride group) include an acid halide group (particularly, an acid chloride group) in which a carboxyl group of each of the carboxylic acids mentioned above is acid-halogenated.

As the reactive hydrocarbon compound used in the exemplary embodiment, particularly in view of rigidity (bending strength, etc.) of a resin, at least one monocarboxylic acid selected from aromatic carboxylic acids and alicyclic carboxylic acids, or an acid halide or acid anhydride thereof are preferable. By adding such a reactive hydrocarbon compound to a cellulose hydroxy group, a structure formed by adding an acyl group derived from at least one monocarboxylic acid selected from aromatic carboxylic acids and alicyclic carboxylic acids to a hydroxy group (i.e., a structure obtained by substituting a hydrogen atom of cellulose hydroxy group with an acyl group) can be obtained.

The number (average value) of reactive hydrocarbon compounds (the number of acyl groups) to be added per glucose unit of cellulose (or a derivative thereof), in other words, the number (average value) of hydroxy groups bound to a reactive hydrocarbon compound per glucose unit (the degree of substitution of the hydroxy group, $DS_{XX}$) is, in view of obtaining a desired effect, preferably 0.1 or more and 0.6 or less and more preferably 0.1 or more and 0.5 or less. Furthermore, after a cardanol component and a reactive hydrocarbon compound are grafted, the number (average value) of remaining hydroxy groups per glucose unit (hydroxy group remaining degree, $DS_{OH}$) is, in view of sufficiently ensuring water resistance, preferably 0.9 or less and more preferably, 0.7 or less.

The reactive hydrocarbon compound can be grafted in the grafting step of a cardanol component. Owing to this, grafting can be made uniformly. At this time, these may be added simultaneously or separately. However, if a cardanol component is grafted and thereafter a reactive hydrocarbon compound is added and grafted, the efficiency of a grafting reaction can be improved.

[Grafting of Flexible Component]

As a flexible component, at least one selected from a reactive thermoplastic polyurethane elastomer (reactive TPU), a reactive silicone and a reactive rubber is preferably used.

[Grafting of Reactive TPU]

As the reactive TPU, TPU having an isocyanate group can be used. The reactive TPU can be bound to cellulose (or a derivative thereof) via a urethane bond formed through a reaction between the isocyanate group of the reactive TPU and a hydroxy group of cellulose (or a derivative thereof).

The reactive TPU that can be used includes a reactive TPU produced by using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a poly-caprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used. Furthermore, both-end isocyanate terminated prepolymers obtained by binding these diisocyanates to both ends of the above polyol are preferably used.

As examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol, glycerin; and aromatic glycols such as 1,4-dimethylolbenzene, bisphenol A and ethylene oxide or a propylene oxide adduct of bisphenol A.

The TPU obtained from these raw materials may be used singly or in combination.

The reactive TPU can be synthesized by a conventional TPU production method, e.g., using the aforementioned raw materials as long as the TPU to be obtained can be reacted with a hydroxy group of a cellulose component and grafted thereto, as synthesis conditions.

If an isocyanate component is excessively supplied in synthesizing TPU, the resultant TPU can possess an unreacted isocyanate group. Since the unreacted isocyanate group can be reacted with a hydroxy group of cellulose (or a derivative thereof), the resultant TPU can be used as a reactive TPU, in other words, can be used for grafting to cellulose (or a derivative thereof). The supply ratio of raw materials can be expressed by an equivalent ratio of the isocyanate group of diisocyanate relative to the total amount of hydroxy groups of a polyol and a chain extender. The isocyanate group is preferably supplied in a ratio of 1.05 to 2.0 equivalents and more preferably in a ratio of 1.05 to 1.5 equivalents relative to the total of hydroxy groups (1 equivalent).

The molecular weight of the reactive TPU is preferably 10,000 or more and more preferably 30,000 or more in view of obtaining a sufficient impact resistance improvement effect. Furthermore, the molecular weight is preferably 1,000,000 or less and more preferably 300,000 or less in view of productivity. The molecular weight can be obtained as a number average molecular weight by GPC (standard sample: polystyrene).

A reactive TPU can be grafted by the addition reaction between an isocyanate group of the reactive TPU and a hydroxy group of cellulose (or a derivative thereof). As a result, the cellulose carbon atom to which the hydroxy group of the cellulose (or a derivative thereof) is bound and the TPU carbon atom to which the isocyanate group of the reactive TPU is bound are linked via a urethane bond.

[Grafting of Reactive Silicone]

In this embodiment, the reactive silicone has a main silicone skeleton and a functional group (reactive functional group A) capable of reacting with and binding to a hydroxy group of cellulose. As the reactive silicone, a polydimethylsiloxane derivative, which has a main chain composed of dimethyl siloxane repeat units and a group containing the reactive functional group bound to the main chain, is preferable. In place of a methyl group of a side chain, an organic group including another type of group such as a phenyl group or a polyether group may be partly contained.

The molecular weight of the reactive silicone in terms of number average molecular weight (g/mol) is preferably 900 or more, more preferably 2000 or more, further preferably 3000 or more and also preferably 100000 or less and more preferably 50000 or less. The molecular weight is preferably set within the molecular weight range mentioned above in view of improving impact resistance while maintaining properties such as strength of a cellulose resin obtained by grafting a cardanol component. Note that as the number average molecular weight, a measurement value (corrected by a polystyrene standard sample) determined by GPC analysis using a 0.1% chloroform solution of a sample can be employed.

The functional group equivalent of a reactive functional group of reactive silicone is preferably 900 g/mol or more, more preferably 2000 g/mol or more, further preferably 3000 g/mol or more and also preferably 100000 g/mol or less and more preferably 50000 g/mol or less, in view of reactivity and an impact resistance improving effect.

Reactive functional group A of reactive silicone is preferred to easily react with a hydroxy group of cellulose (or a derivative thereof) and particularly an isocyanate group and a carboxylic halide group (particularly carboxylic chloride group) are preferably used. The carboxylic halide group can be obtained by forming an acid halide of a carboxyl group before grafted.

In grafting, where reactive functional group A of reactive silicone is an isocyanate group, a carbon atom to which a hydroxy group of cellulose (or a derivative thereof) binds is linked to a silicon atom to which a group containing an isocyanate group of the reactive silicone binds, via a urethane bond.

In grafting, when reactive functional group A of reactive silicone is a carboxylic halide group, a carbon atom to which a hydroxy group of cellulose (or a derivative thereof) binds is linked to a silicon atom to which a group containing a carboxylic halide group of the reactive silicone binds, via an ester bond.

Reactive silicone $S_A$ having such reactive functional group A can be formed by reacting a multifunctional compound having reactive functional group A and modified silicone $S_C$ having reactive functional group C capable of reacting with reactive functional group B of the multifunctional compound. Reactive functional group A and reactive functional group B may be the same in type. For example, diisocyanate (multifunctional compound) can be reacted with modified silicone ($S_C$) having a hydroxy group and then one of the isocyanate groups of diisocyanate is bound to a hydroxy group of the modified silicone ($S_C$) (formation of a urethane bond).

When reactive silicone $S_A$ formed by using such a multifunctional compound is grafted, a cellulose carbon atom to which a hydroxy group of cellulose (or a derivative thereof) binds is linked to a polysiloxane silicon atom to which a group containing reactive functional group C of modified silicone $S_C$ binds, via an organic linking group. The organic linking group may contain a first bond selected from an ester bond, an ether bond and a urethane bond on the side of the cellulose carbon atom and a second bond selected from an amide bond, an ester bond, an ether bond and a urethane bond on the side of the polysiloxane silicon atom.

Modified silicone $S_C$ having reactive functional group C is preferably a modified polydimethylsiloxane having a main chain composed of dimethyl siloxane repeat units in which a part of a side-chain or terminal methyl group is substituted with a group (for example, organic substituent) containing reactive functional group C capable of reacting with the above multifunctional compound. The reactive functional group C is preferably any one of an amino group, an epoxy group, a hydroxy group and a carboxyl group. Owing to such a reactive functional group C present in the modified silicone, the reaction with the multifunctional compound can easily proceed. As such a modified silicone $S_c$, a modified silicone produced in accordance with a conventional method or a commercially available product can be used.

Examples of the reactive functional group C contained in the modified silicone $S_c$ include the organic substituents represented by the following formulas (3) to (11):

[Formula 3]

  (3)

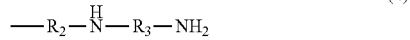  (4)

[Formula 4]

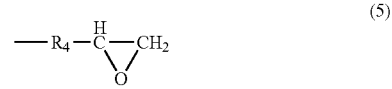  (5)

  (6)

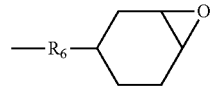  (7)

[Formula 5]

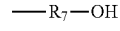  (8)

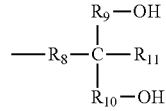  (9)

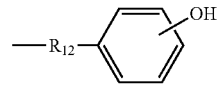  (10)

[Formula 6]

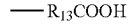  (11)

In the aforementioned formulas, $R_1$ to $R_{10}$, $R_{12}$ and $R_{13}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —(CH$_2$—CH$_2$—O)$_c$— (c represents an integer from 1 to 50) and —[CH$_2$—CH(CH$_3$)—O]$_d$— (d represents an integer from 1 to 50); and —(CH$_2$)$_e$—NHCO— (e represents an integer from 1 to 8). Of these, an alkylene group is preferable and particularly, an ethylene group and a propylene group are preferable.

In the aforementioned formulas, $R_{11}$ represents an alkyl group having 1 to 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

Such a modified silicone $S_c$ is commercially easily available. For example, the following commercially available products are mentioned.

Commercially available products of the amino-modified silicone are as follows.

Examples of branched amino-modified silicones include commercially available products: KF-868, KF-865, KF-864, KF-859, KF-393, KF-860, KF-880, KF-8004, KF-8002, KF-8005, KF-867, X-22-3820W, KF-869 and KF-861 manufactured by Shin-Etsu Chemical Co., Ltd.; commercially available products: FZ3707, FZ3504, BY16-205, FZ3760, FZ3705, BY16-209, FZ3710, SF8417, BY16-849, BY16-850, BY16-879B, BY16-892, FZ3501, FZ3785, BY16-872, BY16-213, BY16-203, BY16-898, BY16-890 manufactured by Dow Corning Toray Co. Ltd.; and commercially available products: TSF4702, TSF4703, TSF4704, TSF4705, TSF4706 manufactured by Momentive Performance Materials Inc.

Examples of both-end amino-modified silicone include commercially available products: PAM-E, KF-8010, X-22-161A, X-22-161B, KF-8012, KF-8008 and X-22-1660B-3 manufactured by Shin-Etsu Chemical Co., Ltd.; and commercially available products: BY16-871, BY16-853C and BY16-853U manufactured by Dow Corning Toray Co. Ltd.

Examples of one-end amino-modified silicone include commercially available products: TSF4700 and TSF4701 manufactured by Momentive Performance Materials Inc.

Examples of branched both-end amino modified silicone (side-chain: amino, both ends: methoxy) include commercially available products: KF-857, KF-8001, KF-862, X-22-9192 and KF-858 manufactured by Shin-Etsu Chemical Co., Ltd.

Commercially available products of epoxy-modified silicone are as follows.

Examples of branched epoxy-modified silicone include commercially available products: X-22-343, KF-101, KF-1001, X-22-2000, X-22-2046, KF-102, X-22-4741, KF-1002 and X-22-3000T manufactured by Shin-Etsu Chemical Co., Ltd.

Examples of both-end epoxy-modified silicone include commercially available products: X-22-163, KF-105, X-22-163A, X-22-163C, X-22169AS and X-22-169B manufactured by Shin-Etsu Chemical Co., Ltd.

Examples of one-end epoxy-modified silicone include a commercially available product: X-22-173DX manufactured by Shin-Etsu Chemical Co., Ltd.

Examples of branched both-end epoxy-modified silicone include a commercially available product: X-22-9002 manufactured by Shin-Etsu Chemical Co., Ltd.

Commercially available products of carbinol-modified silicone are as follows.

Examples of a branched carbinol-modified silicone include commercially available products: X-22-4039 and X-22-4015 manufactured by Shin-Etsu Chemical Co., Ltd.

Examples of both-end carbinol-modified silicone include commercially available products: X-22-160AS, KF-6001, KF-6002 and KF-6003 manufactured by Shin-Etsu Chemical Co., Ltd.

Examples of one-end carbinol-modified silicone include commercially available products: X-22-170BX and X-22-170DX manufactured by Shin-Etsu Chemical Co., Ltd.

Commercially available products of carboxyl-modified silicone are as follows.

Examples of a branched carboxyl-modified silicone include a commercially available product: X-22-3701E manufactured by Shin-Etsu Chemical Co., Ltd.

Examples of both-end carboxyl-modified silicone include a commercially available product: X-22-162 manufactured by Shin-Etsu Chemical Co., Ltd.

Examples of one-end carboxyl modified silicone include a commercially available product: X-22-3710 manufactured by Shin-Etsu Chemical Co., Ltd.

The multifunctional compound and organic linking group mentioned above preferably contain a hydrocarbon group. The number of carbon atoms of the hydrocarbon group is preferably 1 or more, more preferably 2 or more and also preferably 20 or less, more preferably 14 or less and further preferably 8 or less. If the number of carbon atoms is excessively large, the size of the molecule becomes excessively large, with the result that reactivity may decrease. As such a hydrocarbon group, a divalent group is preferable. Examples thereof include divalent linear aliphatic hydrocarbon groups (particularly linear alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring, a cyclohexane ring, a cyclooctane ring, a bicyclopentane ring, a tricyclohexane ring, a bicyclooctane ring, a bicyclononane ring and a tricyclodecane ring; divalent aromatic hydrocarbon groups such as a benzene ring, a naphthalene ring and a biphenylene group; and divalent groups obtained by combining these.

As the reactive functional group of the multifunctional compound, a group selected from a carboxyl group, a carboxylic anhydride group, a carboxylic halide group (particularly a carboxylic chloride group), an epoxy group, an isocyanate group and a halogen group is preferable. Of them, a carboxyl group, a carboxylic anhydride group, a halogen group (particularly a chloride group) and an isocyanate group are preferable. As reactive functional group A to be reacted with a hydroxy group of cellulose (or a derivative thereof), particularly, an isocyanate group and a carboxylic halide group (particularly a carboxylic chloride group) are preferable. As reactive functional group B to be reacted with reactive functional group C of modified silicone $S_C$, particularly, a carboxyl group, a carboxylic halide group (particularly, a carboxylic chloride group) and an isocyanate group are preferable. The carboxylic halide group can be formed by forming an acid halide of a carboxyl group before binding.

Specific examples of such a multifunctional compound include dicarboxylic acids, carboxylic anhydrides, dicarboxylic halides, monochlorocarboxylic acids and diisocyanates. Examples of the dicarboxylic acids include malonic acid, succinic acid, glutaric acid, pimelic acid, suberic acid, azelaic acid, sebacic acid, dodecane dicarboxylic acid, pentadecane dicarboxylic acid, hexadecane dicarboxylic acid. Examples of the carboxylic anhydrides include anhydrides of these dicarboxylic acids. Examples of the dicarboxylic halides include acid halides of these dicarboxylic acids. Examples of the monochlorocarboxylic acids include monochloroacetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of diisocyanates include tolylene diisocyanate (TDI), 4,4'-diphenyl methane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatemethyloctane, lysine ester triisocyanate, 1,3,6-hexamethylene triisocyanate, bicycloheptane triisocyanate and dicyclohexylmethane diisocyanate (HMDI: hydrogenated MDI). Of these, tolylene diisocyanate (TDI), 4,4'-diphenylmethane diisocyanate (MDI) and 1,6-hexamethylene diisocyanate (HDI) can be preferably used.

[Grafting of Reactive Rubber]

As reactive rubber, a flexible rubber-like substance having a reactive functional group capable of reacting with and binding to a hydroxy group of cellulose (or a derivative thereof) can be used. Rubber-like substances of a natural rubber system and a synthetic rubber system can be used.

Natural rubber (NR) is a substance containing cis-polyisoprene $[(C_5H_8)_n]$, which is contained in tree sap of a rubber tree, as a main component and produced by in-vivo addition polymerization. In the tree sap, NR is present as latex in which organic components are dispersed in an aqueous solution. Latex is collected, purified, coagulated and dried to obtain raw rubber.

Compared to polyisoprene (a synthetic rubber) obtained by chemically polymerizing isoprene, the polyisoprene of natural rubber somewhat differs in structure. First of all, in synthetic polyisoprene, 100% cis-form polyisoprene cannot be obtained at present and a small amount of trans-form is contained. In addition, natural rubber contains small amounts of protein and fatty acid other than polyisoprene; whereas, synthesis polyisoprene is free from such impurities.

Polyisoprene of cis-form tends to have an irregular structure having a folded molecular chain and have many gaps between molecular chains. Because of this, the intermolecular force becomes relatively weak. As a result, crystallization of molecules rarely occurs and polyisoprene of cis-form acquires flexible properties and suitably serves as a flexible component. In contrast, a rubber formed of trans polyisoprene (so-called Gutta Percha or gutta-percha) tends to have a linear structure and the distance between a molecular chain and a molecular chain is short. Because of this, the intermolecular force becomes strong. As a result, intermolecular micro-crystallization occurs and a hard resin substance is resulted, which is not suitable as a flexible component.

In this embodiment, the reactive natural rubber is obtained by adding a reactive functional group capable of reacting with a hydroxy group of cellulose (or a derivative thereof) to natural rubber containing the aforementioned cis-polyisoprene as a main component. The reactive natural rubber is prepared by adding a compound having a functional group (e.g., an epoxy group, a carboxyl group, an acid chloride group, an isocyanate group) capable of reacting with and binding to a hydroxy group of cellulose (or a derivative thereof), to an unsaturated bond and another type of functional group (for example, an epoxy group formed by oxidizing an unsaturated bond) in natural rubber. Such a reactive natural rubber may partly contain, other than these reactive functional groups, a functional group enhancing compatibility to a cellulose resin. Examples of such a functional group include a phenyl group, a polyether group and a hydroxy group.

In the embodiment, the reactive synthetic rubber is obtained by adding a reactive functional group capable of reacting with a hydroxy group of cellulose (or a derivative thereof) to a synthetic rubber. Examples of the synthetic rubber include acrylic rubber (ACM), nitrile rubber (NBR), isoprene rubber (IR), ethylene propylene rubber (EPM, EPDM), epichlorohydrin rubber (CO, ECO), styrene-butadiene rubber (SBR), butadiene rubber (BR) and polyisobutylene (butyl rubber IIR). The reactive synthetic rubber is prepared by adding a compound having a functional group (an epoxy group, a carboxyl group, an acid chloride group, an isocyanate group) capable of reacting with and binding to a hydroxy group of cellulose (or a derivative thereof), to an unsaturated bond and another type of functional group in a synthetic rubber. Such a reactive synthetic rubber may partly contain a functional group enhancing compatibility to a cellulose resin, other than these reactive functional groups. Examples of such a functional group include a phenyl group, a polyether group and a hydroxy group.

[Grafting Process]

A grafting process can be carried out by heating cellulose (or a derivative thereof), a cardanol component, a flexible component and optionally, a reactive hydrocarbon compound, in a solvent capable of dissolving them at an appropriate temperature. Cellulose is rarely dissolved in a general solvent, but it can be dissolved in a dimethyl sulfoxide-amine solvent, a dimethylformamide-chloral-pyridine solvent, a dimethylacetamide-lithium chloride solvent and an imidazolium ion liquid. In the case where a grafting reaction is performed in a general solvent, a cellulose derivative changed in solubility by previously binding a carboxylic acid and an alcohol to a part of hydroxy groups of cellulose to reduce intermolecular force, can be used. An acylated cellulose obtained by substituting a hydrogen atom of a hydroxy group with an acyl group such as an acetyl group, a propionyl group and a butyryl group is preferable and particularly cellulose acetate obtained by acetylation with acetic acid or acetyl chloride is preferable. Acetic acid, propionic acid, butyric acid, and halides and anhydrides of these acids which are used for these acetylations are included in the reactive hydrocarbon compound mentioned above. Like this example, part or whole of a predetermined reactive hydrocarbon compound can be added (graphed) to a hydroxy group of cellulose before a cardanol component is grafted.

A flexible component can be grafted to a cardanol-added cellulose resin having a cardanol component (if necessary, a reactive hydrocarbon) graphed thereto.

If the flexible component is reactive TPU, grafting can be performed by adding reactive TPU, for example, to a heated cardanol-added cellulose resin, and mixing them. The reaction temperature can be set at, for example, 150 to 200° C. and the reaction time can be set, for example, at 10 minutes to 4 hours. If the reaction temperature is sufficiently high, the cardanol-added cellulose resin is sufficiently fused to obtain a homogeneous reaction system. If the reaction temperature is set within an appropriate temperature range, thermolysis of the cardanol-added cellulose resin and the reactive TPU can be prevented. The addition amount of reactive TPU is preferably 1% by mass or more, more preferably 3% by mass or more, and further preferably 5% by mass or more based on the total supply amount of reactive TPU and the cardanol-added cellulose resin, in view of obtaining a sufficient impact resistance improvement effect. In view of obtaining other properties such as resin strength, the addition amount of reactive TPU is preferably 50% by mass or less, more preferably 30% by mass or less, and further preferably 20% by mass or less.

If the flexible component is reactive silicone, grafting can be performed by adding reactive silicone, for example, to cardanol-added cellulose resin dissolved in a solvent such as dehydrated dioxane, and mixing them. The reaction temperature can be set at, for example, 80 to 150° C. and the reaction time, for example, at 1 to 5 hours. If the reaction temperature is sufficiently high, the reaction system can be easily homogenized. If the reaction temperature is set within an appropriate temperature range, thermolysis of the cardanol-added cellulose resin and the reactive silicone can be prevented. The addition amount of reactive silicone is preferably 0.5% by mass or more, more preferably 1% by mass or more, and further preferably 2% by mass or more based on the total supply amount of reactive silicone and cardanol-added cellulose resin, in view of obtaining a sufficient impact resistance improvement effect. In view of obtaining other properties such as resin strength, the addition amount of reactive silicone is preferably 50% by mass or less, more preferably 30% by mass or less, and further preferably 20% by mass or less.

If the flexible component is reactive rubber, the addition amount of reactive rubber is preferably 1% by mass or more, more preferably 3% by mass or more, and further preferably 5% by mass or more based on the total supply amount of reactive rubber and cardanol-added cellulose resin, in view of obtaining a sufficient impact resistance improvement effect. In view of obtaining other properties such as resin strength, the addition amount of reactive rubber is preferably 50% by mass or less, more preferably 30% by mass or less, and further preferably 20% by mass or less.

The amount of flexible component bound (binding amount) based on the total amount of cellulose resin (including cardanol component) is preferably 0.5% by mass or more, and more preferably 1% by mass or more, in view of obtaining a sufficient impact resistance improvement effect. In view of obtaining other properties such as resin strength, the binding amount is preferably 50% by mass or less, more preferably 30% by mass or less, and further preferably 20% by mass or less. Particularly, if the flexible component is reactive TPU, the binding amount thereof is preferably 1% by mass or more, more preferably 3% by mass or more and further preferably 5% by mass or more. If the flexible component is reactive silicone, the binding amount is preferably 0.5% by mass or more, more preferably 1% by mass or more, and further preferably 2% by mass or more. If the flexible component is reactive rubber, the binding amount is preferably 1% by mass or more, more preferably 3% by mass or more, and further preferably 5% by mass or more.

[Remaining Amount of Hydroxy Group]

The remaining hydroxy group which is not used for grafting of a cardanol component and a flexible component is an intact hydroxy group, a hydroxy group modified such as acetylation as described above, or a hydroxy group grafted with a reactive hydrocarbon compound. As the amount of hydroxy group increases, maximum strength and heat resistance tend to increase; however, water-absorbing properties tend to increase. As the conversion rate (substitution rate) of a hydroxy group increases, the water-absorbing properties decrease and plasticity and breaking strain tend to increase; however, maximum strength and heat resistance tend to decrease. In consideration of these tendencies and grafting conditions, the conversion rate of a hydroxy group can be appropriately set.

In view of sufficiently obtaining water resistance, the number of remaining hydroxy groups (hydroxy group remaining rate, $DS_{OH}$) (average value) per glucose unit of a grafted cellulose resin is preferably 0.9 or less and more preferably 0.7 or less.

[Substitution Rate of Hydroxy Group by Acylation]

In view of water-absorbing properties, mechanical strength and heat resistance, it is preferable that the hydroxy groups of cellulose are partly acylated by the reactive hydrocarbon. Furthermore, in view of the aforementioned grafting process of a cardanol component and a flexible component, it is preferable that the hydroxyl groups of cellulose are appropriately acylated (particularly acetylated) before the cardanol component and flexible component are grafted. The number of acyl groups (average value) added per glucose unit of cellulose (or a derivative thereof), that is, the number of acylated hydroxy groups (hydroxy group substitution rate, $DS_{AC}$) (average value) is preferably 0.5 or more, more preferably 1.0 or more, and further preferably 1.5 or more, in view of obtaining a sufficient acylation effect. Furthermore, in view of sufficiently obtaining the grafting rate ($DS_{CD}$) of a cardanol component and the grafting rate of a flexible component, the hydroxy group substitution rate, $DS_{AC}$ by acylation is preferably 2.7 or less, more preferably 2.5 or less and further preferably 2.2 or less. The acyl group to be added by acylation is preferably at least one selected from an acetyl group, a propionyl group and a butyryl group. Note that the substitution rate in the case of acetylation is represented by $DS_{Ace}$, the substitution rate in the case of propionylation by $DS_{Pr}$ and the substitution rate in the case of butyrylation by $DS_{Bu}$.

[Ratio of Plant Component]

In the cellulose resin of the embodiment, the total mass ratio (plant component ratio) of a cellulose component and a cardanol component relative to the whole grafted cellulose resin is preferably 50% or more, and more preferably 60% or more, in view of obtaining sufficient plant availability. Herein, calculation is made provided that the cellulose component corresponds to the structure represented by the formula (1), in which a hydroxy group is not acylated or modified by grafting; whereas the cardanol component corresponds to the structure represented by the formula (2).

[Additives]

To the cellulose resin in accordance with the embodiment described above, various types of additives conventionally used for thermoplastic resins can be used. For example, if a plasticizer is added, thermoplasticity and breaking elongation can be further improved. Examples of such a plasticizer include phthalic acid esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyvalent alcohol esters such as triacetin, diacetyl glycerin, tripropionitrile glycerin and glycerin monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyl triethyl citrate and acetyl tributyl citrate; epoxylated vegetable oils such as epoxylated soybean oil and epoxylated linseed oil; castor oil and a derivative thereof; benzoic acid esters such as ethyl O-benzoylbenzoate; aliphatic dicarboxylic acid esters such as sebacic acid ester and azelaic acid ester; unsaturated dicarboxylic acid esters such as maleic acid ester; and others such as N-ethyl toluene sulfonamide, triacetin, O-cresyl p-toluenesulfonate and tripropionin.

Examples of the other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

A reactive functional group (a carboxylic acid group, a group derived from a carboxylic acid group, other functional groups) in such a plasticizer can be reacted with a phenolic hydroxy group or an unsaturated bond of cardanol to obtain a plasticizer with cardanol-added thereto. Such a plasticizer can be used. If such a plasticizer is used, compatibility of the cellulose resin of the embodiment and the plasticizer can be improved and thus the addition effect of the plasticizer can be further improved.

To the cellulose resin of the embodiment, if necessary, an inorganic or organic granular or fibrous filler can be added. If the filler is added, strength and rigidity can be further improved. Examples of the filler include mineral-substance particles (e.g., talc, mica, baked diatom earth, kaolin, sericite, bentonite, smectite, clay, silica, quartz powder, glass beads, glass powder, glass flake, milled fiber, wollastonite), boron-containing compounds (e.g., boron nitride, boron carbide, titanium borate), metal carbonates (e.g., magnesium carbonate, heavy calcium carbonate, light calcium carbonate), metal silicates (e.g. calcium silicate, aluminum silicate, magnesium silicate, magnesium aluminosilicate), metal oxides (e.g., magnesium oxide), metal hydroxides (e.g. aluminum hydroxide, calcium hydroxide, magnesium hydroxide), metal sulfates (e.g., calcium sulfate, barium sulfate), metal carbides (e.g., silicon carbide, aluminum carbide, titanium carbide), metal nitrides (e.g. aluminum nitride, silicon nitride, titanium nitride), white carbon and metal foils. Examples of fibrous fillers include organic fibers (e.g. natural fiber, paper), inorganic fibers (e.g. glass fiber, asbestos fiber, carbon fiber, silica fiber, silica alumina fiber, wollastonite, zirconia fiber, and potassium titanate fiber) and metal fibers. These fillers can be used alone or in combination two or more types.

To the cellulose resin of the embodiment, if necessary, a flame retardant can be added. If the flame retardant is added, flame retardancy can be imparted. Examples of the flame retardant include magnesium hydroxide, aluminum hydroxide, metal hydrates such as hydrotalcite, basic magnesium carbonate, calcium carbonate, silica, alumina, talc, clay, zeolite, bromine flame retardant, antimony trioxide, phosphoric flame retardant (e.g., an aromatic phosphoric acid ester and aromatic condensed phosphoric acid ester) and a compound containing phosphorus and nitrogen (phosphazene compound). These flame retardants can be used alone or in combination of two or more types.

Furthermore, as the flame retardant, a reaction product of phosphorus oxide, phosphoric acid or a derivative of these and cardanol, and a polymer of the reaction product can be used. If such a flame retardant is used, the interaction between a cellulose resin of the embodiment and a flame retardant is reinforced and an excellent flame retardancy effect can be obtained. Examples of such a flame retardant include a reaction product obtained by reacting phosphorus oxide ($P_2O_5$) or phosphoric acid ($H_3PO_4$) with the phenolic hydroxy group of cardanol, and a polymer obtained by adding hexamethylene tetramine to the reaction product, followed by polymerizing.

To the cellulose resin of the embodiment, if necessary, a impact resistance improver can be added. If the impact resistance improver is added, impact resistance can be improved. Examples of the impact resistance improver include a rubber component and a silicone compound. Examples of the rubber component include natural rubber, epoxylated natural rubber and synthetic rubber. Examples of the silicone compound include organic polysiloxanes formed by polymerization of e.g., alkyl siloxane and alkylphenyl siloxane, and modified silicone compounds obtained by modifying a side chain or an end of each of the organic polysiloxanes by polyether, methylstyryl, an alkyl, a higher fatty acid ester, an alkoxy, fluorine, an amino group, an epoxy group, a carboxyl group, a carbinol group, a methacryl group, a mercapto group and a phenol group. These impact resistance improvers can be used alone or in combination of two or more.

As the impact resistance improver, a cardanol polymer containing cardanol as a main component may be used. Such a impact resistance improver is excellent in compatibility with a cellulose resin in accordance with the embodiment and thus a higher impact resistance improving effect can be obtained. Specific examples thereof include a cardanol polymer obtained by adding formaldehyde to cardanol and reacting this with an unsaturated bond of a linear hydrocarbon of the cardanol, and a cardanol polymer obtained by adding a catalyst such as sulfuric acid, phosphoric acid, diethoxytrifluoroboron to cardanol and reacting unsaturated bonds of a linear hydrocarbon of the cardanol with each other.

To the cellulose resin of the embodiment, if necessary, additives conventionally used in resin compositions, such as a colorant, an antioxidant and a thermal stabilizer may be added.

To the cellulose resin of the embodiment, if necessary, a general thermoplastic resin may be added.

A method for producing a resin composition containing the cellulose resin of the exemplary embodiment and additives or a thermoplastic resin, is not particularly limited. For example, the resin composition can be produced by melting and mixing additives and the cellulose resin manually by handmixing or by use of a known mixer such as a tumbler mixer, a ribbon blender, a single-axial or a multiaxial mixing extruder, and a compounding apparatus such as a kneader and kneading roll and, if necessary, granulating the mixture into an appropriate shape. In another preferable process, additives and a resin are dispersed in solvent such as an organic solvent and are mixed and furthermore, if necessary, a coagulation solvent is added to obtain a mixed composition of the additives and the resin and thereafter, the solvent is evaporated.

The cellulose resin in accordance with the exemplary embodiments mentioned above can be used as a base resin for a molding material. The molding material formed of a resin composition containing the cellulose resin as a base resin is suitable for forming housing such as packaging for an electronic device.

The base resin herein refers to a main component of a composition and means that other components may be contained as long as the components do not prevent the function of the main component. The content rate of the main component is not particularly limited; however, the content rate of the main component in a composition is preferably 50% by mass or more, more preferably 70% by mass or more, further preferably 80% by mass or more and particularly preferably 90% by mass or more.

EXAMPLES

The present invention will be more specifically described by way of examples below.

Preparation of a cardanol component and grafting thereof was performed in accordance with Synthesis Examples 1 to 3 below to obtain cardanol-added cellulose resins. Reactive TPU (flexible component) was prepared in accordance with each of Synthesis Examples 4 to 6 and grafted to a cardanol-added cellulose resin in accordance with Example 1. Furthermore, reactive silicone (flexible component) was prepared in accordance with Synthesis Example 7 and grafted to a cardanol-added cellulose resin in accordance with Example 2.

Synthesis Example 1

Preparation of Cardanol Derivative (Chlorinated Monochloroacetic Acid-Modified Cardanol)

A hydrogenated cardanol (m-n-pentadecyl phenol manufactured by ACROS Organics), in which an unsaturated bond of the straight chain hydrocarbon moiety of cardanol is hydrogenated, was used as a raw material. A carboxyl group was added by reacting the phenolic hydroxy group with monochloroacetic acid to obtain carboxylated hydrogenated cardanol. Next, the carboxyl group was chlorinated by oxalyl chloride and converted into an acid chloride group to obtain chlorinated hydrogenated cardanol. More specifically, chlorinated hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) (manufactured by Kanto Chemical Co., Inc.) dissolved in methanol (50 mL) was added dropwise. After completion of the dropwise addition, the reaction solution was continuously stirred while being refluxed at 73° C. for 4 hours, and then cooled to room temperature. Thereafter, the reaction mixture was acidified with diluted hydrochloric acid up to pH=1. To this, methanol (250 mL), diethyl ether (500 mL) and further, distilled water (200 mL) were added. The water layer was separated by a separation funnel and discarded. The ether layer was washed twice with distilled water (400 mL). To the ether layer, anhydrous magnesium was added to dry the ether layer, which was separated by filtration. The filtrate (ether layer) was concentrated by an evaporator (90° C./3 mmHg) under reduced pressure. As the residue, a yellow brown powdery crude product was obtained. The crude product was recrystallized from n-hexane and dried under vacuum to obtain carboxylated hydrogenated cardanol as white powder (46 g (0.12 mol)).

The obtained carboxylated hydrogenated cardanol (46 g (0.12 mol)) was dissolved in dehydrated chloroform (250 mL), and oxalyl chloride (24 g (0.19 mol)) and N,N-dimethylformamide (0.25 mL (3.2 m mol)) was added. The mixture was stirred at room temperature for 72 hours. Chloroform, excessive oxalyl chloride and N,N-dimethylformamide were distilled away under reduced pressure to obtain chlorinated hydrogenated cardanol (48 g (0.13 mol)).

Synthesis Example 2

Preparation of Cardanol-Added Cellulose Resin
(A-1: Cardanol Grafted Cellulose Acetate)
(Corresponding to Reference Example 5 Later Described)

Chlorinated hydrogenated cardanol (cardanol derivative) of Synthesis Example 1 was allowed to bind to cellulose acetate (trade name: LM-80, manufactured by Daicel Chemical Industries, Ltd., the addition number of acetic acid molecules per glucose unit of cellulose (acetyl substitution rate: $DS_{Ace}$)=2.1) to obtain grafted cellulose acetate. More specifically, cardanol grafted cellulose acetate was prepared in accordance with the following procedure.

Cellulose acetate (10 g (the amount of hydroxy group: 0.036 mol)) was dissolved in dehydrated dioxane (200 mL), and triethyl amine (5.0 mL (0.036 mol)) serving as a reaction catalyst and an acid trapping agent was added. To the solution, a dioxane solution (100 mL), in which chlorinated hydrogenated cardanol (12 g (0.031 mol)) of Synthesis Example 2 was dissolved, was added. The mixture was heated to reflux at 100° C. for 3 hours. The reaction solution was gently added dropwise to methanol (3 L) while stirring and a solid substance reprecipitated was separated by filtration. The solid substance separated by filtration was dried overnight in the air and further dried at 105° C. for 5 hours under vacuum to obtain cardanol grafted cellulose acetate (14 g).

The obtained sample (cardanol grafted cellulose acetate) was measured by $^1$H-NMR (product name: AV-400, manufactured by Bruker Co. Ltd., 400 MHz). As a result, $DS_{CD}$ was 0.44.

Synthesis Example 3

Preparation of Cardanol-Added Cellulose Resin
(A-2: Cardanol Grafted Cellulose Acetate)
(Corresponding to Reference Example 7 Later Described)

The chlorinated hydrogenated cardanol (cardanol derivative) of Synthesis Example 1 and benzoyl chloride (BC) as reactive hydrocarbon were allowed to bind to cellulose acetate (trade name: LM-80 manufactured by Daicel Chemical Industries, Ltd., the addition number of acetic acid molecules per glucose unit of cellulose (acetyl substitution rate: $DS_{Ace}$)=2.1) to obtain grafted cellulose acetate. Specifically, cardanol grafted cellulose acetate was prepared in accordance with the following procedure.

Cellulose acetate (10 g (the amount of hydroxy group: 0.036 mol)) was dissolved in dehydrated dioxane (200 mL) and triethyl amine (5.0 mL (0.036 mol)) serving as a reaction catalyst and an acid trapping agent was added. To the solution, a dioxane solution (100 mL), in which the chlorinated hydrogenated cardanol (4.1 g (0.011 mol)) of Synthesis Example 1 and benzoyl chloride (BC) (2.8 g (0.020 mol)) manufactured by Tokyo Chemical Industry Co., Ltd. were dissolved, was added and heated to reflux at 100° C. for 5 hours. The reaction solution was gently added dropwise to methanol (3 L) while stirring and a solid substance reprecipitated was separated by filtration. The solid substance separated by filtration was dried overnight in the air and further dried at 105° C. for 5 hours under vacuum to obtain cardanol grafted cellulose acetate (13 g).

The obtained sample (cardanol grafted cellulose acetate) was measured by $^1$H-NMR (product name: AV-400 manufactured by Bruker Co. Ltd., 400 MHz). As a result, $DS_{CD}$ was 0.30 and $DS_{BC}$ was 0.14.

Synthesis Example 4

Preparation of Polyester Polyol

Sebacic acid (MW 202.25) (9.4 g (0.046 mol)), 3-methyl pentane diol (MW 118.17) (7.6 g (0.064 mol)) and tributyl titanate (0.005 g) were placed in a reaction container and heated under nitrogen flow at normal pressure. The temperature in the reaction vessel was gradually increased from 150° C. to 220° C. over 16 hours to remove water out of the reaction vessel system. The reaction was further continued at 220° C. for 4 hours to obtain polyester polyol.

The obtained polyester polyol had a hydroxy value of 54. As a result of GPC measurement (gel permeation chromatography, standard sample: polystyrene), the number average molecular weight was 2000.

Synthesis Example 5

Preparation of Both-End Isocyanate Terminated Prepolymer

In a reaction container purged with nitrogen, diphenyl methane diisocyanate (MDI, MW 250.25) (3.7 g (0.015 mol)) was heated to melt at 60° C. Next, polyester polyol (16 g (the amount of hydroxy group: 0.015 mol)) of Synthesis Example 4 heated to 70 to 80° C. was added and reacted within the range of 80 to 90° C.

The content of isocyanate group was measured every 30 minutes. When the content of isocyanate reached a calculated value, heating was terminated and gradually cooled to obtain a both-end isocyanate terminated prepolymer.

The content of isocyanate in the both-end isocyanate terminated prepolymer was 3.5% by mass.

Synthesis Example 6

Preparation of Reactive TPU (C-1)

A solution in which the polyester polyol (10 g (the amount of hydroxy group: 0.010 mol)) of Synthesis Example 4 and the both-end isocyanate terminated prepolymer (13.2 g (the amount of isocyanate group: 0.011 mol)) of Synthesis Example 5 were mixed was hardened by a hot air dryer of 80° C. for 12 hours to obtain reactive TPU.

The molecular weight of the obtained reactive TPU was determined by GPC (standard sample: polystyrene). As a result, the number average molecular weight was 220,000.

Example 1

The reactive TPU (C-1) of Synthesis Example 6 was allowed to bind to cardanol-added cellulose resin (A-2) of Synthesis Example 3 to obtain a reactive TPU grafted cellulose resin. Specifically, the reactive TPU grafted cellulose resin was prepared in accordance with the following procedure.

To the cardanol-added cellulose resin (A-2) of Synthesis Example 3 (90 parts by mass), the reactive TPU (C-1) of Synthesis Example 6 (10 parts by mass) was added. The mixture was mixed by an extruder mixer (HAAKE MiniLab Rheomex extruder, Model CTW5, Thermo Electron Corp., Waltham, Mass.) for 10 minutes at a temperature of 200° C. and a screw rotation speed of 60 rpm to obtain a reactive TPU grafted cellulose resin.

The obtained cellulose resin was subjected to press molding in the following conditions to obtain molded products.
(Molding Conditions)

Temperature: 200° C., Time: 2 minutes, Pressure: 100 kgf ($9.8 \times 10^2$ N),

Size of molded product (molding 1): Thickness: 2 mm, Width: 13 mm, Length: 80 mm.

Size of molded product (molding 2): Thickness: 4 mm, Width: 10 mm, Length: 80 mm.

The obtained molded products were evaluated in accordance with the following procedure. The results are shown in Table 1.

[Evaluation of Izod Impact Strength]

Molding 2 obtained by molding in the above was subjected to the measurement of Izod impact strength (provided with a notch) in accordance with JIS K7110.

[Bending Test]

Molding 1 obtained by molding in the above was subjected to a bending test in accordance with JIS K7171.

[Measurement of Glass Transition Temperature (Heat Resistance Evaluation)]

Glass transition temperature was measured by DSC (product name: DSC6200, manufactured by Seiko Instruments Inc.).

[Determination of Coefficient of Water Absorption]

The coefficient of water absorption was determined in accordance with JIS K7209. Specifically, the weight increase rate of molding 1 was determined when it was soaked in pure water at normal temperature for 24 hours.

[Moldability]

When the obtained cellulose resin was molded in the above molding conditions, the surface state of the molded products was visually observed and evaluated in accordance with the following criteria.

◯: Neither breeding out nor peel-off is observed in the surface of a molded product, Δ: Breeding out and peel-off are partly observed in the surface of a molded product (less than 20% of the surface of the molded product)

x: Breeding out and peel-off are observed in the surface of a molded product (20% or more of the surface of the molded product).

Comparative Example 1

A molded product of cardanol-added cellulose resin (A-2) of Synthesis Example 3 was prepared and evaluated in the same conditions as in Example 1. The results are shown in Table 1.

Comparative Example 2

To the cardanol-added cellulose resin (A-2) of Synthesis Example 3 (90 parts by mass), non-reactive TPU (adipate ester-based TPU, trade name: RESAMINE P6165, manufactured by Dainichiseika Color and Chemicals Mfg. Co., Ltd.) (10 parts by mass) was added. The mixture was heated and mixed in the same conditions as in Example 1 to prepare a cellulose resin composition.

A molded product of the obtained cellulose resin composition was prepared and evaluated in the same manner as in Example 1. The results are shown in Table 1.

Comparative Example 3

A solution was prepared by mixing the polyester polyol of Synthesis Example 4 and a both-end isocyanate terminated prepolymer of Synthesis Example 5 in a weight ratio of 1.00: 1.32 (the same ratio in preparing the reactive TPU of Synthesis Example 6). Next, to cardanol-added cellulose resin (A-2) of Synthesis Example 3 (90 parts by mass), the above solution mixture (10 parts by mass) was added to prepare a cellulose resin composition in the same manner as in Comparative Example 2.

A molded product was prepared from the obtained cellulose resin composition and evaluated in the same manner as in Example 1. The results are shown in Table 1.

TABLE 1

| | | Example 1 | Comparative Example 1 | Comparative Example 2 | Comparative Example 3 |
|---|---|---|---|---|---|
| Composition | Cellulose resin | C-1 grafted A-2 | A-2 | A-2 | A-2 |
| | Content [% by mass] | 100 | 100 | 90 | 90 |
| | Additive | — | — | TPU | Polyol, Diisocyanate |
| | Content [% by mass] | — | — | 10 | 10 |
| Evaluation results | Impact strength [KJ/m$^2$] | 17.3 | 4.4 | 7.2 | 7.5 |
| | Bending strength [MPa] | 106 | 113 | 106 | 104 |
| | Bending elasticity [GPa] | 2.1 | 2.2 | 2.1 | 2.0 |
| | Bend-breaking strain [%] | >10 | >10 | >10 | >10 |

TABLE 1-continued

|  | Example 1 | Comparative Example 1 | Comparative Example 2 | Comparative Example 3 |
|---|---|---|---|---|
| Glass transition temperature (heat resistance) [° C.] | 153 | 154 | 151 | 150 |
| Water absorption rate [%] | 1.3 | 1.3 | 1.3 | 1.3 |
| Moldability | ◯ | ◯ | ◯ | ◯ |

As is apparent from comparison between Example 1 (reactive TPU-grafted cardanol-added cellulose resin), Comparative Example 1 (reactive TPU-ungrafted cardanol-added cellulose resin), Comparative Example 2 (a composition containing cardanol-added cellulose resin and non-reactive TPU) and Comparative Example 3 (a composition containing polyol and diisocyanate serving as raw materials for reactive TPU and cardanol-added cellulose resin), it is found that the reactive TPU-grafted cardanol-added cellulose resin is improved in impact resistance, while maintaining strength, heat resistance (Tg) and water resistance at satisfactory levels.

Furthermore, compared to the reactive TPU-ungrafted cardanol-added cellulose resin of Comparative Example 1, the reactive TPU-grafted cellulose resin of Example 1 exhibits equivalent or more excellent meltability and satisfactory thermoplasticity in the same molding conditions.

Synthesis Example 7

Preparation of Reactive Silicone (C-2: Isocyanate Modified Silicone)

Carbinol-modified silicone (trade name: X-22-170DX, manufactured by Shin-Etsu Chemical Co., Ltd., functional group equivalent: 4667 g/mol, number average molecular weight: 4667 g/mol) and toluene diisocyanate (manufactured by Kanto Chemical Co., Inc.) were allowed to bind to obtain isocyanate-modified silicone (C-2). Specifically, isocyanate modified silicone was prepared in accordance with the following procedure.

In a reaction container purged with nitrogen, carbinol-modified silicone (20 g (the amount of hydroxy group: 0.0043 mol)) was supplied, and toluene diisocyanate (0.75 g) (0.0043 mol) was added. The mixture was stirred at 80° C. for one hour. This was cooled to room temperature to obtain a reaction product of 20.7 g.

The obtained isocyanate-modified silicone was measured by $^1$H-NMR (product name: AV-400, manufactured by Bruker Co. Ltd., 400 MHz). As a result, the content of a reaction product obtained by reacting a carbinol-modified silicone component and a toluene diisocyanate component in a ratio of 1:1, was 90% by mass or more.

Example 2

Isocyanate modified silicone of Synthesis Example 7 was allowed to bind to the cardanol-added cellulose resin of Synthesis Example 2 to obtain a silicone grafted cellulose resin. Specifically, the silicone grafted cellulose resin was prepared in accordance with the following procedure.

The cardanol-added cellulose resin of Synthesis Example 2 (20 g (the amount of hydroxy group: 0.047 mol)) was dissolved in dehydrated dioxane (400 mL), and tin octylate (0.02 g (0.00005 mol)) was added as a reaction catalyst. To the solution, a dioxane solution (20 mL) in which the isocyanate modified silicone of Synthesis Example 7 (8.5 g (0.0017 mol)) was dissolved was added. The resultant solution was heated to reflux at 90° C. for 5 hours. The reaction solution was gently added dropwise to methanol (4 L) while stirring and the solid substance reprecipitated was filtrated. Thereafter, the solid substance filtrated was washed with hexane (2 L) once and dried overnight in the air and further dried at 105° C. for 5 hours under vacuum to obtain a silicone grafted cellulose resin (18 g).

The obtained sample (silicone grafted cellulose resin) was measured by $^1$H-NMR (manufactured by Bruker Co. Ltd., product name: AV-400, 400 MHz). As a result, the mass ratio of the modified silicone component bound to the cardanol-modified silicone cellulose resin was 3.2% by mass.

A molded product of the resultant silicone-grafted cellulose resin was prepared and evaluated in the same manner as in Example 1. The results are shown in Table 2.

Comparative Example 4

A molded product of the cardanol-added cellulose resin (A-1) of Synthesis Example 2 was prepared and evaluated in the same manner as in Example 1. The results are shown in Table 2.

Comparative Example 5

To the cardanol-added cellulose resin (A-1) of Synthesis Example 2 (97 parts by mass), non-reactive carbinol-modified silicone (trade name: X-22-170DX, manufactured by Shin-Etsu Chemical Co., Ltd., functional group equivalent: 4667 g/mol, number average molecular weight: 4667 g/mol) (3 parts by mass) was added, heated and mixed in the same conditions as in Example 2 to prepare a cellulose resin composition.

A molded product of the obtained cellulose resin composition was prepared and evaluated in the same manner as in Example 1. The results are shown in Table 2.

TABLE 2

|  |  | Example 2 | Comparative Example 4 | Comparative Example 5 |
|---|---|---|---|---|
| Composition | Cellulose resin | C-1 grafted A-1 | A-1 | A-1 |
|  | Content [% by mass] | 100 | 100 | 97 |
|  | Additive | — | — | Carbinol-modified silicone |
|  | Content [% by mass] | — | — | 3 |
| Evaluation results | Impact strength [KJ/m$^2$] | 9.9 | 6.7 | 7.0 |
|  | Bending strength [MPa] | 60 | 60 | 58 |

TABLE 2-continued

|  | Example 2 | Comparative Example 4 | Comparative Example 5 |
|---|---|---|---|
| Bending elasticity [GPa] | 1.4 | 1.4 | 1.4 |
| Bend-breaking strain [%] | >10 | >10 | >10 |
| Glass transition temperature (heat resistance) [° C.] | 141 | 142 | 141 |
| Water absorption rate [%] | 1.3 | 1.3 | 1.3 |
| Moldability | ○ | ○ | X |

As is apparent from comparison between Example 2 (silicone component-grafted cardanol-added cellulose resin), Comparative Example 4 (silicone component-ungrafted cardanol-added cellulose resin) and Comparative Example 5 (composition containing cardanol-added cellulose resin and non-reactive silicone component), it is found that silicone component-grafted cardanol-added cellulose resin is improved in impact resistance while maintaining strength, heat resistance (Tg) and water resistance at satisfactory levels.

Furthermore, compared to the silicone component-ungrafted cardanol-added cellulose resin of Comparative Example 4, the silicone component-grafted cellulose resin of Example 2 exhibits equivalent or more excellent meltability and satisfactory thermoplasticity in the same molding conditions.

A flexible component ungrafted cardanol-added cellulose resin will be further described by way of specific examples, below.

Reference Synthesis Example 1

Cardanol Derivative 1 (Preparation of Chloridized and Succinic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. When the hydrogenated cardanol was measured by $^1$H-NMR (product name: AV-400, 400 MHz, manufactured by Bruker), no unsaturated bond was detected. Thus, it was confirmed that a hydrogenation rate is at least 90% by mole or more. The phenolic hydroxy group of the cardanol was reacted with succinic anhydride to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, succinic anhydride (33 g (0.33 mol)) was dissolved in dehydrated chloroform (250 mL). To this, dehydrated pyridine (5.0 mL (0.062 mol)) and a raw material, i.e., hydrogenated cardanol (50 g (0.16 mol)) were added. The reaction solution was heated to reflux under a nitrogen atmosphere at 70° C. for 24 hours, cooled to room temperature. Thereafter, a crystal of succinic anhydride precipitated was separated by filtration. The chloroform solution filtrated was washed twice with 0.1 mol/L hydrochloric acid (250 mL) and further washed twice with water (250 mL). After washing, the chloroform solution was dehydrated with magnesium sulfate and magnesium sulfate was separated by filtration and chloroform was distilled away under reduced pressure to obtain a brown solid substance of carboxylated and hydrogenated cardanol (60 g (0.15 mol)).

The resultant carboxylated and hydrogenated cardanol (50 g (0.12 mol)) was dissolved in dehydrated chloroform (250 mL). To this, oxalyl chloride (24 g (0.19 mol)) and N,N-dimethylformamide (0.25 mL (3.2 mmol)) were added. The reaction solution was stirred at room temperature for 72 hours. Chloroform, excessive oxalyl chloride and N,N-dimethylformamide were distilled away under reduced pressure to obtain chloridized and hydrogenated cardanol (52 g (0.12 mol)).

Reference Synthesis Example 2

Cardanol Derivative 2 (Preparation of Chloridized and Monochloroacetic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) (manufactured by Kanto Chemical Co., Inc.) dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The resultant carboxylated and hydrogenated cardanol (46 g (0.12 mol)) was dissolved in dehydrated chloroform (250 mL). To this, oxalyl chloride (24 g (0.19 mol)) and N,N-dimethylformamide (0.25 mL (3.2 mmol)) were added. The mixture was stirred at room temperature for 72 hours. Chloroform, excessive oxalyl chloride and N,N-dimethylformamide were distilled away under reduced pressure to obtain chloridized and hydrogenated cardanol (48 g (0.13 mol)).

Reference Synthesis Example 3

Preparation of Biphenylacetyl Chloride

Biphenylacetic acid (6.0 g (0.028 mol)) manufactured by Sigma-Aldrich Co. LLC was dissolved in dehydrated chloroform (60 ml). To this, oxalyl chloride (3.7 g (0.029 mol)) and N,N-dimethylformamide (0.04 ml (0.51 mmol)) were added. The mixture was stirred at room temperature for 72 hours. Chloroform, excessive oxalyl chloride and N,N-dimethylformamide were distillated away under reduced pressure to obtain biphenylacetyl chloride (6.5 g (0.028 mol)).

Reference Example 1

The chloridized and hydrogenated cardanol (cardanol derivative 1) prepared in Reference Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (46 g (0.11 mol)) prepared in Reference Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (20 g).

The obtained sample (grafted cellulose acetate) was measured by $^1$H-NMR (product name: AV-400, 400 MHz, manufactured by Bruker), and $DS_{CD}$ was 0.90.

Furthermore, the sample was evaluated in the following procedure. The results are shown in Table 101A.
[Evaluation of Thermoplasticity (Press Moldability)]
Press molding was performed in the following conditions to obtain a molded product. At that time, moldability was evaluated in accordance with the following criteria.
(Molding Conditions)
Temperature: 170° C., Time: 2 minutes, Pressure: 100 kgf ($9.8 \times 10^2$ N),
Size of molded product: Thickness: 2 mm, Width: 13 mm, Length: 80 mm.
(Evaluation Criteria)
○: Good, △: not good (void, sink mark or partial uncharged portion was observed), x: cannot be molded.
[Measurement of Glass Transition Temperature (Heat Resistance Evaluation)]
Glass transition temperature was measured by DSC (product name: DSC6200, manufactured by Seiko Instruments Inc.).
[Bending Test]
The molded product obtained by the aforementioned molding process was subjected to a bending test in accordance with JIS K7171.
[Tensile Test]
A solution of a sample (2 g) dissolved in chloroform (20 mL) was prepared. The solution was subjected to casting and a film of 10 mm in width, 60 mm in length and 0.2 mm in thickness was prepared by cutting out by a cutter knife. The film was subjected to a tensile test in accordance with JIS K7127.
[Measurement of Water Absorption Rate]
Water absorption rate was obtained by measurement in accordance with JIS K7209.

[Determination of Plant-Component Ratio]
A cellulose component and a cardanol component were regarded as plant components. The total content rate (% by mass) of the plant components relative to the whole sample was obtained. Assuming that the cellulose component herein corresponds to that having a structure represented by Formula (1) above in which a hydroxy group is not acylated or grafted, and that the cardanol component corresponds to that having a structure represented by Formula (2) above, calculation was made.

Reference Example 2

The chloridized and hydrogenated cardanol (cardanol derivative 1) prepared in Reference Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (23 g (0.054 mol)) prepared in Reference Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Reference Example 1. The results are shown in Table 101A.

Reference Example 3

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (14 g (0.037 mol)) prepared in Reference Synthesis Example 2 was added. The reaction solution was heated to reflux at 100° C. for 3 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Reference Example 1. The results are shown in Table 101A.

Reference Example 4

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of the chloridized and hydrogenated cardanol was changed to 21 g (0.054 mol) to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.80.

Furthermore, the sample was evaluated in the same manner as in Reference Example 1. The results are shown in Table 101A.

Reference Example 5

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of chloridized and hydrogenated cardanol was changed to 12 g (0.031 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.44.

Furthermore, the sample was evaluated in the same manner as in Reference Example 1. The results are shown in Table 101A.

Reference Example 6

The chloridized and hydrogenated cardanol (cardanol derivative 2) prepared in Reference Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 3 except that the supply amount of the chloridized and hydrogenated cardanol was changed to 6.9 g (0.018 mol) to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30.

Furthermore, the sample was evaluated in the same manner as in Reference Example 1. The results are shown in Table 101A.

Reference Example 7

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.1 g (0.011 mol)) prepared in Reference Synthesis Example 2 and benzoyl chloride (BC) (2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.14.

Furthermore, the sample was evaluated in the same manner as in Reference Example 1. The results are shown in Table 101B.

Reference Example 8

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 3.1 g (0.008 mol) and the supply amount of benzoyl chloride was changed to 8.4 g (0.060 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.22 and $DS_{BC}$ was 0.27.

Furthermore, the sample was evaluated in the same manner as in Reference Example 1. The results are shown in Table 101B.

Reference Example 9

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 7.6 g (0.020 mol) and the supply amount of benzoyl chloride was changed to 8.4 g (0.060 mol) to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.44 and $DS_{BC}$ was 0.22.

Furthermore, the sample was evaluated in the same manner as in Reference Example 1. The results are shown in Table 101B.

Reference Example 10

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 4.1 g (0.011 mol) and the supply amount of benzoyl chloride was changed to 28.1 g (0.20 mol) to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.24 and $DS_{BC}$ was 0.42.

Furthermore, the sample was evaluated in the same manner as in Reference Example 1. The results are shown in Table 101B.

Reference Example 11

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 4.6 g (0.012 mol) and the supply amount of benzoyl chloride was changed to 1.1 g (0.008 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.07.

Furthermore, the sample was evaluated in the same manner as in Reference Example 1. The results are shown in Table 101B.

Reference Example 12

The chloridized and hydrogenated cardanol (cardanol derivative 2) prepared in Reference Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 7 except that the supply amount of the chloridized and hydrogenated cardanol was changed to 1.5 g (0.004 mol) and the supply amount of benzoyl chloride was changed to 2.2 g (0.016 mol) to obtain grafted cellulose acetate (12 g).

The obtained sample (grafted cellulose acetate) was measured by $^1$H-NMR (product name: AV-400, 400 MHz, manufactured by Bruker), and $DS_{CD}$ was 0.08 and $DS_{BC}$ was 0.16.

Furthermore, the sample was evaluated in the same manner as in Reference Example 1. The results are shown in Table 101B.

Reference Example 13

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (7.0 g (0.018 mol)) prepared in Reference Synthesis Example 2 and biphenylacetyl chloride (BAA) (1.5 g (0.0065 mol)) prepared in Reference Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.27 and $DS_{BAA}$ was 0.15.

Furthermore, the sample was evaluated in the same manner as in Reference Example 1. The results are shown in Table 101B.

Reference Example 14

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 13 except that the supply amount of the chloridized and hydrogenated cardanol was changed to 12.2 g (0.032 mol) and the supply amount of biphenylacetyl chloride was changed to 4.6 g (0.020 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.40 and $DS_{BAA}$ was 0.40.

Furthermore, the sample was evaluated in the same manner as in Reference Example 1. The results are shown in Table 101B.

Reference Example 15

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 13 except that the supply amount of the chloridized and hydrogenated cardanol was changed to 15.2 g (0.040 mol) and the supply amount of biphenylacetyl chloride was changed to 3.2 g (0.014 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.55 and $DS_{BAA}$ was 0.28.

Furthermore, the sample was evaluated in the same manner as in Reference Example 1. The results are shown in Table 101B.

Reference Example 16

The chloridized and hydrogenated cardanol (cardanol derivative 2) prepared in Reference Synthesis Example 2 and biphenylacetyl chloride (BAA) prepared in Reference Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 13 except that the supply amount of the chloridized and hydrogenated cardanol was changed to 7.6 g (0.020 mol) and the supply amount of biphenylacetyl chloride was changed to 7.4 g (0.032 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BAA}$ was 0.52.

Furthermore, the sample was evaluated in the same manner as in Reference Example 1. The results are shown in Table 101B.

Reference Example 17

The chloridized and hydrogenated cardanol (cardanol derivative 2) prepared in Reference Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.0 g (0.011 mol)) prepared in Reference Synthesis Example 2 and phenylpropionyl chloride (PPA) (2.0 g (0.012 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.17 and $DS_{PPA}$ was 0.25.

Furthermore, the sample was evaluated in the same manner as in Reference Example 1. The results are shown in Table 101C.

Reference Example 18

The chloridized and hydrogenated cardanol (cardanol derivative 2) prepared in Reference Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Reference Example 17 except that the supply amount of the chloridized and hydrogenated cardanol was changed to 3.8 g (0.010 mol) and the supply amount of phenylpropionyl chloride was changed to 2.7 g (0.016 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.13 and $DS_{PPA}$ was 0.35.

Furthermore, the sample was evaluated in the same manner as in Reference Example 1. The results are shown in Table 101C.

Reference Example 19

The chloridized and hydrogenated cardanol (cardanol derivative 2) prepared in Reference Synthesis Example 2 and cyclohexanecarboxylic acid chloride (CHC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (3.7 g (0.0096 mol)) prepared in Reference Synthesis Example 2 and cyclohexanecarboxylic acid chloride (CHC) (2.5 g (0.017 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.20 and $DS_{CHC}$ was 0.22.

Furthermore, the sample was evaluated in the same manner as in Reference Example 1. The results are shown in Table 101C.

Reference Example 20

The chloridized and hydrogenated cardanol (cardanol derivative 2) prepared in Reference Synthesis Example 2 and biphenylcarbonyl chloride (BCC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.6 g (0.012 mol)) prepared in Reference Synthesis Example 2 and biphenylcarbonyl chloride (BCC) (13.0 g (0.060 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.30 and $DS_{BCC}$ was 0.30.

Furthermore, the sample was evaluated in the same manner as in Reference Example 1. The results are shown in Table 101C.

Reference Example 21

The chloridized and hydrogenated cardanol (cardanol derivative 2) prepared in Reference Synthesis Example 2 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, the grafted cellulose acetate was prepared in accordance with the following procedure.

Cellulose acetate (15.8 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (6.8 g (0.018 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.19.

Furthermore, the sample was evaluated in the same manner as in Reference Example 1. The results are shown in Table 102.

Reference Example 22

The chloridized and hydrogenated cardanol (cardanol derivative 2) prepared in Reference Synthesis Example 2 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, grafted cellulose acetate (25 g) was prepared in accordance with the same content and manner as in Reference Example 21 except that the supply amount of chloridized and hydrogenated cardanol was changed to 41.2 g (0.108 mol).

The obtained sample (grafted cellulose acetate) was measured by $^1$H-NMR (product name: AV-400, 400 MHz, manufactured by Bruker), and $DS_{CD}$ was 0.50.

Furthermore, the sample was evaluated in the same manner as in Reference Example 1. The results are shown in Table 102.

Reference Example 23

The chloridized and hydrogenated cardanol (cardanol derivative 2) prepared in Reference Synthesis Example 2 was allowed to bind to cellulose acetate butyrate (trade name: CAB-381-20, manufactured by Eastman Chemical Company, the number of acetic acid molecules added to a single glucose unit of cellulose (degree of acetylation: $DS_{Ace}$)=1.0; the number of butyric acid molecules added to a single glucose unit of cellulose (degree of butyration: $DS_{Bu}$)=1.66) to obtain grafted cellulose acetate butyrate. More specifically, the grafted cellulose acetate butyrate was prepared in accordance with the following procedure.

Cellulose acetate butyrate (10 g (hydroxy-group amount: 0.011 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate butyrate (13 g).

The obtained sample (grafted cellulose acetate butyrate) was measured by $^1$H-NMR (product name: AV-400, 400 MHz, manufactured by Bruker), and $DS_{CD}$ was 0.34.

Furthermore, the sample was evaluated in the same manner as in Reference Example 1. The results are shown in Table 103.

Reference Example 24

The chloridized and hydrogenated cardanol (cardanol derivative 2) prepared in Reference Synthesis Example 2 was allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$)=0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Reference Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.34.

Furthermore, the sample was evaluated in the same manner as in Reference Example 1. The results are shown in Table 103.

Reference Example 25

The chloridized and hydrogenated cardanol (cardanol derivative 2) prepared in Reference Synthesis Example 2 and benzoyl chloride (BC) as a reactive hydrocarbon were allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$)=0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (4.5 g (0.012 mol)) prepared in Reference Synthesis Example 2 and benzoyl chloride (BC) (2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.21 and $DS_{BC}$ was 0.10.

Furthermore, the sample was evaluated in the same manner as in Reference Example 1. The results are shown in Table 103.

Reference Example 26

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. More specifically, the carboxylated and hydrogenated cardanol was prepared in accordance with the following procedure.

First, hydrogenated cardanol (80 g (0.26 mol)) was dissolved in methanol (120 mL). To this, an aqueous solution dissolving sodium hydroxide (64 g (1.6 mol)) in distilled water (40 mL) was added. Thereafter, at room temperature, a solution of monochloro acetic acid (66 g (0.70 mol)) manufactured by Kanto Chemical Co., Inc. dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The carboxylated and hydrogenated cardanol thus prepared was allowed to bind to cellulose (trade name: KC Flock W-50G manufactured by Nippon Paper Chemicals) to obtain grafted cellulose. More specifically, the grafted cellulose was prepared in accordance with the following procedure.

Cellulose (2.5 g (hydroxy-group amount: 47 mmol)) was suspended in methanol (100 mL) and stirred for one hour at room temperature and filtrated by suction. The solid substance separated by filtration was allowed to swell with dimethylacetamide (DMAc)(100 mL), stirred one hour at room temperature and filtrated by suction to remove the solvent. Thereafter, swelling with DMAc and solvent removal by suction filtration were repeated three times in the same manner. LiCl (21 g) was dissolved in DMAc (250 mL) and the DMAc-swollen cellulose previously obtained was mixed and stirred at room temperature overnight to obtain a cellulose solution. To the cellulose solution thus obtained, a DMAc solution (20 mL) dissolving the carboxylated and hydrogenated cardanol (17.3 g (46.5 mmol)), pyridine (11.0 g (140 mmol)) and tosyl chloride (8.8 g (46 mmol)) was added. The reaction solution was reacted by heating at 50° C. for one hour. The reaction solution was added dropwise to methanol (2 L) to allow reprecipitation. The resultant solid substance was separated by filtration, washed three times with methanol (500 mL) and dried under vacuum at 105° C. for 5 hours to obtain grafted cellulose (10.4 g). $DS_{CD}$ was obtained from the yield, and $DS_{CD}$ was 1.49. Furthermore, the sample was evaluated in the same manner as in Reference Example 1. The results are shown in Table 104.

Reference Comparative Example 1

The same cellulose acetate before grafting as that used in Reference Example 1 was used as a comparative sample.

The cellulose acetate was evaluated in the same manner as in Reference Example 1. The results are shown in Table 101C.

Note that the cellulose acetate did not melt even if heated and did not exhibit thermoplasticity. Furthermore, since the cellulose acetate could not be molded, a bending test was not performed.

Reference Comparative Example 2

To the same cellulose acetate before grafting as that used in Reference Example 1, triethyl citrate (trade name: Citroflex-2 manufactured by Pfizer Inc.) was added as a plasticizer such that the content became 45% by mass based on the whole resin composition. This was mixed by an extruder mixer (HAAKE MiniLab Rheomex extruder (Model CTW5, Thermo Electron Corp., Waltham, Mass.)) at a temperature of 200° C. and a screw rotation speed of 60 rpm to prepare a cellulose acetate resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 3

A cellulose acetate resin composition was prepared in accordance with the same content and manner as in Reference Comparative Example 2 except that the addition amount of triethyl citrate was set to 56% by mass based on the whole resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 4

A cellulose acetate resin composition was prepared in accordance with the same content and manner as in Reference Comparative Example 2 except that the addition amount of triethyl citrate was set to 34% by mass based on the whole resin composition.

The resin composition was evaluated in the same manner as in Reference Example 1. The results are shown in Table 101C.

Note that when the resin composition was casted, a phase separation occurred and a uniform film could not be prepared. Thus, a tensile test was not performed.

Reference Comparative Example 5

Phenylpropionyl chloride (PPA) was used as a reactive hydrocarbon and allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving phenylpropionyl chloride (PPA) (10 g (0.060 mol)) manufactured by Tokyo Kasei Kogyo Co., Ltd., was added. The reaction solution was heated to reflux at 100° C. for one hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (12 g).

The obtained sample (grafted cellulose acetate) was measured by $^1$H-NMR (product name: AV-400, 400 MHz, manufactured by Bruker), and $DS_{PPA}$ was 0.47.

The sample was evaluated in the same manner as in Reference Example 1. The results are shown in Table 101C.

Note that the cellulose acetate did not melt even if heated and did not exhibit thermoplasticity. Furthermore, since the cellulose acetate could not be molded, a bending test was not performed.

Reference Comparative Example 6

The same cellulose acetate before grafting ($DS_{Ace}$=2.4) as that used in Reference Example 21 was used as a comparative sample.

The cellulose acetate was evaluated in the same manner as in Reference Example 1. The results are shown in Table 102.

Note that the cellulose acetate did not melt even if heated and did not exhibit thermoplasticity. Furthermore, since the cellulose acetate could not be molded, a bending test was not performed.

Reference Comparative Example 7

To the same cellulose acetate ($DS_{Ace}$=2.4) before grafting as that used in Reference Example 21, triethyl citrate (trade name: Citroflex-2 manufactured by Pfizer Inc.) was added as a plasticizer such that the content became 20% by mass based on the whole resin composition. This was mixed by an extruder mixer (HAAKE MiniLab Rheomex extruder (Model CTW5, Thermo Electron Corp., Waltham, Mass.)) at a temperature of 190° C. and a screw rotation speed of 60 rpm) to prepare a cellulose acetate resin composition.

The resin composition was evaluated in the same manner as in Reference Example 1. The results are shown in Table 102.

Note that when the resin composition was casted, a phase separation occurred and a uniform film could not be prepared. Thus, a tensile test was not performed.

Reference Comparative Example 8

A cellulose acetate resin composition was prepared in accordance with the same content and manner as in Reference Comparative Example 7 except that the addition amount of triethyl citrate was set to 40% by mass based on the whole resin composition.

The resin composition was evaluated in the same manner as in Reference Example 1. The results are shown in Table 102.

Note that when the resin composition was casted, a phase separation occurred and a uniform film could not be prepared. Thus, a tensile test was not performed.

Reference Comparative Examples 9 and 10

The same cellulose acetate butyrate and cellulose acetate propionate before grafting as those that used in Reference Examples 23 and 24 were used as comparative samples respectively.

The cellulose acetate butyrate and cellulose acetate propionate were evaluated in the same manner as in Reference Example 1. The results are shown in Table 103.

Note that the cellulose acetate butyrate and cellulose acetate propionate melted when heated. They had thermoplasticity; however, melt viscosity was extremely large. Since it was difficult to mold them, a bending test was not performed.

Reference Comparative Examples 11 and 12

To each of the same cellulose acetate butyrate and cellulose acetate propionate before grafting as those used in Reference Examples 23 and 24 respectively, triethyl citrate (trade name: Citroflex-2 manufactured by Pfizer Inc.) was added as a plasticizer such that the content became 27% by mass based on the whole resin composition. This was mixed by an extruder mixer (HAAKE MiniLab Rheomex extruder (Model CTW5, Thermo Electron Corp., Waltham, Mass.)) at a temperature of 180° C. and a screw rotation speed of 60 rpm to prepare a cellulose acetate butyrate resin composition and a cellulose acetate propionate resin composition.

The resin compositions were evaluated in the same manner as in Reference Example 1. The results are shown in Table 103.

Note that when each of the resin compositions was casted, a phase separation occurred and a uniform film could not be prepared. Thus, a tensile test was not performed.

Reference Comparative Example 13

To compare with Reference Example 26, a resin composition composed of cellulose acetate and triethyl citrate as a plasticizer was prepared in accordance with the same manner as in Reference Comparative Example 2 except that the addition amount of the plasticizer was changed to 63% by mass based on the whole resin composition. The total amount of plasticizer and acetyl group was set to be equal to the amount of cardanol of Reference Example 26. The resin composition was evaluated in the same manner as in Reference Example 1. The results are shown in Table 104.

Note that when the resin composition was casted, a phase separation occurred and a uniform film could not be prepared. Thus, a tensile test was not performed.

Reference Comparative Example 14

An unsaturated bond of cardanol represented by the above Formula (2)(LB-7000: a mixture of 3-pentadecylphenol (about 5%), 3-pentadecylphenol monoene (about 35%), 3-pentadecylphenol diene (about 20%), 3-pentadecylphenol triene (about 40%); manufactured by Tohoku Chemical Industries, Ltd.) was chemically bound to a hydroxy group of a cellulose (trade name: KC Flock W-50G manufactured by Nippon Paper Chemicals) to obtain cardanol-grafted cellulose. More specifically, the cardanol-grafted cellulose was prepared in accordance with the following procedure.

In a dry box, a reaction solvent was prepared from borontrifluoride diethyl ether ($BF_3$-$OEt_2$) (manufactured by Kanto Chemical Co., Inc.) (80 mL) and methylene chloride (100 mL) (manufactured by Kanto Chemical Co., Inc.) under a nitrogen gas atmosphere. To this, cellulose (2 g) was added and the mixture was stirred at room temperature for 2 hours. Thereafter, the cellulose was separated by filtration from the reaction solvent and dried under vacuum. Thereafter, to this, liquid-state cardanol (LB-7000)(100 mL) as mentioned above was added and a grafting reaction was performed while stirring at room temperature for 3 hours. After completion of the reaction, a product was separated by filtration, washed with acetone, extracted by Soxhlet and dried under vacuum at 105° C. for 5 hours to obtain a desired cardanol-grafted cellulose composition (2.5 g). $DS_{CD}$ was obtained from a yield, and $DS_{CD}$ was 0.16.

Note that the composition did not melt even if heated and did not exhibit thermoplasticity. Furthermore, since the composition could be neither molded nor casted, evaluation, such as a bending test and tensile test, was not performed.

TABLE 3

Table 101A

| | | Reference Example 1 | Reference Example 2 | Reference Example 3 | Reference Example 4 | Reference Example 5 | Reference Example 6 |
|---|---|---|---|---|---|---|---|
| Amount of acetyl group | $DS_{Ace}$ | 2.1 | 2.1 | 2.1 | 2.1 | 2.1 | 2.1 |
| | Mass fraction (%) | 16 | 20 | 21 | 21 | 23 | 26 |
| Amount of cardanol derivative | $DS_{CD}$ modified with succinic acid | 0.90 | 0.55 | 0 | 0 | 0 | 0 |
| | $DS_{CD}$ modified with monochloro acetic acid | 0 | 0 | 0.55 | 0.80 | 0.44 | 0.30 |
| | Mass fraction (%) | 56 | 46 | 43 | 53 | 38 | 29 |
| Amount of reactive hydrocarbon compound | $DS_{xx}$ | 0 | 0 | 0 | 0 | 0 | 0 |
| | Mass fraction (%) | 0 | 0 | 0 | 0 | 0 | 0 |
| Addition amount of plasticizer (% by mass) | | 0 | 0 | 0 | 0 | 0 | 0 |
| Bending strength (MPa) | | 38 | 48 | 50 | 36 | 60 | 83 |
| Bending elastic modulus (GPa) | | 0.80 | 1.1 | 1.2 | 0.80 | 1.4 | 1.9 |
| Bend-breaking strain (%) | | >10 | >10 | >10 | >10 | >10 | >10 |
| Tensile strength (MPa) | | 29 | 36 | 38 | 27 | 45 | 59 |
| Tensile elastic modulus (GPa) | | 0.6 | 0.9 | 1.0 | 0.6 | 1.2 | 1.7 |
| Tensile breaking strain (%) | | 57 | 55 | 53 | 57 | 51 | 48 |
| Glass transition temperature (° C.) (heat resistance) | | 125 | 134 | 147 | 139 | 142 | 150 |
| Thermoplasticity (press moldability) | | ○ | ○ | ○ | ○ | ○ | ○ |
| Water absorption rate (%) | | 1.1 | 1.5 | 1.2 | 0.94 | 1.3 | 1.7 |
| Plant component ratio (%) | | 71 | 70 | 73 | 76 | 72 | 71 |

TABLE 4

Table 101B

| | | Reference Example 7 | Reference Example 8 | Reference Example 9 | Reference Example 10 | Reference Example 11 | Reference Example 12 | Reference Example 13 | Reference Example 14 | Reference Example 15 | Reference Example 16 |
|---|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 | 2.1 |
| | Mass fraction (%) | 25 | 26 | 21 | 24 | 25 | 31 | 24 | 20 | 18 | 20 |
| Amount of cardanol derivative | $DS_{CD}$ modified with succinic acid | 0 | 0 | 0 | 0 | 0 | 0 | 0 | 0 | 0 | 0 |
| | $DS_{CD}$ modified with monochloro acetic acid | 0.30 | 0.22 | 0.44 | 0.24 | 0.30 | 0.08 | 0.27 | 0.40 | 0.55 | 0.30 |
| | Mass fraction (%) | 28 | 22 | 36 | 22 | 29 | 9.4 | 25 | 30 | 39 | 23 |
| Amount of reactive hydrocarbon compound | $DS_{xx}$ | xx = BC 0.14 | xx = BC 0.27 | xx = BC 0.22 | xx = BC 0.42 | xx = BC 0.07 | xx = BC 0.16 | xx = BAA 0.15 | xx = BAA 0.40 | xx = BAA 0.28 | xx = BAA 0.52 |
| | Mass fraction (%) | 4.0 | 8.0 | 5.4 | 12 | 1.8 | 5.7 | 7.3 | 16 | 11 | 21 |
| Addition amount of plasticizer (% by mass) | | 0 | 0 | 0 | 0 | 0 | 0 | 0 | 0 | 0 | 0 |
| Bending strength (MPa) | | 113 | 118 | 106 | 112 | 94 | 95 | 106 | 107 | 93 | 95 |
| Bending elastic modulus (GPa) | | 2.2 | 2.6 | 2.1 | 2.2 | 1.9 | 2.9 | 2.5 | 2.0 | 1.9 | 2.1 |
| Bend-breaking strain (%) | | >10 | >10 | >10 | >10 | >10 | 6.5 | >10 | >10 | >10 | >10 |
| Tensile strength (MPa) | | 69 | 72 | 66 | 70 | 64 | 75 | 65 | 65 | 63 | 64 |
| Tensile elastic modulus (GPa) | | 1.6 | 1.8 | 1.6 | 1.6 | 1.5 | 1.9 | 1.8 | 1.5 | 1.4 | 1.6 |
| Tensile breaking strain (%) | | 48 | 47 | 52 | 47 | 50 | 30 | 45 | 46 | 48 | 45 |
| Glass transition temperature (° C.) (heat resistance) | | 154 | 155 | 144 | 156 | 152 | 158 | 148 | 150 | 142 | 147 |
| Thermoplasticity (press moldability) | | ○ | ○ | ○ | ○ | ○ | ○ | ○ | ○ | ○ | ○ |
| Water absorption rate (%) | | 1.3 | 1.6 | 1.1 | 1.2 | 1.4 | 1.9 | 1.0 | 0.72 | 0.68 | 0.65 |
| Plant component ratio (%) | | 68 | 64 | 68 | 61 | 69 | 62 | 65 | 60 | 66 | 55 |

TABLE 5

Table 101C

| | | Reference Example 17 | Reference Example 18 | Reference Example 19 | Reference Example 20 | Reference Comparative Example 1 | Reference Comparative Example 2 | Reference Comparative Example 3 | Reference Comparative Example 4 | Reference Comparative Example 5 |
|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 |
| | Mass fraction (%) | 26 | 27 | 26 | 22 | 36 | 20 | 16 | 24 | 29 |
| Amount of cardanol derivative | $DS_{CD}$ modified with succinic acid | 0 | 0 | 0 | 0 | 0 | 0 | 0 | 0 | 0 |
| | $DS_{CD}$ modified with monochloro acetic acid | 0.17 | 0.13 | 0.20 | 0.30 | 0 | 0 | 0 | 0 | 0 |
| | Mass fraction (%) | 17 | 13 | 20 | 25 | 0 | 0 | 0 | 0 | 0 |
| Amount of reactive hydrocarbon compound | $DS_{xx}$ | xx = PPA 0.25 | xx = PPA 0.35 | xx = CHC 0.22 | xx = BCC 0.30 | 0 | 0 | 0 | 0 | xx = PPA 0.47 |
| | Mass fraction (%) | 9.7 | 14 | 7.1 | 13 | 0 | 0 | 0 | 0 | 20 |
| Addition amount of plasticizer (% by mass) | | 0 | 0 | 0 | 0 | 0 | 45 | 56 | 34 | 0 |
| Bending strength (MPa) | | 106 | 108 | 111 | 109 | — | 15 | 11 | 24 | — |
| Bending elastic modulus (GPa) | | 2.5 | 2.6 | 2.5 | 2.5 | — | 0.41 | 0.29 | 0.72 | — |
| Bend-breaking strain (%) | | >10 | >10 | >10 | >10 | — | >10 | >10 | >10 | — |
| Tensile strength (MPa) | | 65 | 66 | 68 | 67 | 60 | — | — | — | 52 |
| Tensile elastic modulus (GPa) | | 1.4 | 1.4 | 1.6 | 1.5 | 2.3 | — | — | — | 1.9 |
| Tensile breaking strain (%) | | 60 | 58 | 55 | 50 | 9.0 | — | — | — | 16 |
| Glass transition temperature (° C.) (heat resistance) | | 143 | 142 | 146 | 150 | 227 | 40 | 25 | 71 | 152 |

TABLE 5-continued

Table 101C

|  | Reference Example 17 | Reference Example 18 | Reference Example 19 | Reference Example 20 | Reference Comparative Example 1 | Reference Comparative Example 2 | Reference Comparative Example 3 | Reference Comparative Example 4 | Reference Comparative Example 5 |
|---|---|---|---|---|---|---|---|---|---|
| Thermoplasticity (press moldability) | ○ | ○ | ○ | ○ | x | ○ | ○ | ○ | x |
| Water absorption rate (%) | 1.9 | 1.8 | 1.8 | 1.4 | 17 | 5.1 | 4.3 | 5.7 | 4.5 |
| Plant component ratio (%) | 61 | 58 | 64 | 65 | 64 | 35 | 28 | 42 | 51 |

TABLE 6

Table 102

|  |  | Reference Example 21 | Reference Example 22 | Reference Comparative Example 6 | Reference Comparative Example 7 | Reference Comparative Example 8 |
|---|---|---|---|---|---|---|
| Amount of acetyl group | $DS_{Ace}$ | 2.4 | 2.4 | 2.4 | 2.4 | 2.4 |
|  | Mass fraction (%) | 31 | 24 | 31 | 39 | 24 |
| Amount of cardanol derivative | $DS_{CD}$ modified with monochloro acetic acid | 0.19 | 0.50 | 0 | 0 | 0 |
|  | Mass fraction (%) | 20 | 40 | 0 | 0 | 0 |
| Addition amount of plasticizer (% by mass) |  | 0 | 0 | 0 | 20 | 40 |
| Bending strength (MPa) |  | 120 | 59 | — | 50 | 20 |
| Bending elastic modulus (GPa) |  | 2.8 | 1.5 | — | 2.3 | 0.80 |
| Bend-breaking strain (%) |  | >10 | >10 | — | >10 | >10 |
| Tensile strength (MPa) |  | 55 | 38 | 58 | — | — |
| Tensile elastic modulus (GPa) |  | 1.8 | 1.0 | 2.1 | — | — |
| Tensile breaking strain (%) |  | 34 | 53 | 11 | — | — |
| Glass transition temperature (° C.) (heat resistance) |  | 154 | 134 | 216 | 90 | 63 |
| Thermoplasticity (press moldability) |  | ○ | ○ | x | ○ | ○ |
| Water absorption rate (%) |  | 2.1 | 1.2 | 9.0 | 3.1 | 2.6 |
| Plant component ratio (%) |  | 66 | 71 | 61 | 49 | 36 |

TABLE 7

Table 103

|  |  | Reference Example 23 | Reference Example 24 | Reference Example 25 | Reference Comparative Example 9 | Reference Comparative Example 10 | Reference Comparative Example 11 | Reference Comparative Example 12 |
|---|---|---|---|---|---|---|---|---|
| Amount of acetyl group | $DS_{Ace}$ | 1.0 | 0.18 | 0.18 | 1.0 | 0.18 | 1.0 | 0.18 |
|  | Mass fraction (%) | 9.8 | 1.8 | 2.0 | 13 | 2.5 | 9.8 | 1.8 |
| Amount of butyryl/propionyl group | $DS_{Bu}$ or $DS_{Pr}$ | $DS_{Bu}$ 1.66 | $DS_{Pr}$ 2.49 | $DS_{Pr}$ 2.49 | $DS_{Bu}$ 1.66 | $DS_{Pr}$ 2.49 | $DS_{Bu}$ 1.66 | $DS_{Pr}$ 2.49 |
|  | Mass fraction (%) | 27 | 27 | 36 | 37 | 46 | 27 | 34 |
| Amount of cardanol derivative | $DS_{CD}$ modified with monochloro acetic acid | 0.34 | 0.33 | 0.21 | 0 | 0 | 0 | 0 |
|  | Mass fraction (%) | 27 | 27 | 19 | 0 | 0 | 0 | 0 |
| Amount of reactive hydrocarbon compound | $DS_{xx}$ | 0 | 0 | xx = BC 0.10 | 0 | 0 | 0 | 0 |
|  | Mass fraction (%) | 0 | 0 | 2.7 | 0 | 0 | 0 | 0 |
| Addition amount of plasticizer (% by mass) |  | 0 | 0 | 0 | 0 | 0 | 27 | 27 |
| Bending strength (MPa) |  | 45 | 49 | 60 | — | — | 23 | 15 |
| Bending elastic modulus (GPa) |  | 1.3 | 1.4 | 1.6 | — | — | 0.79 | 0.82 |
| Bend-breaking strain (%) |  | >10 | >10 | >10 | — | — | >10 | >10 |
| Tensile strength (MPa) |  | 35 | 39 | 43 | 36 | 40 | — | — |
| Tensile elastic modulus (GPa) |  | 0.85 | 0.87 | 1.0 | 1.0 | 1.1 | — | — |
| Tensile breaking strain (%) |  | 100 | 98 | 82 | 55 | 52 | — | — |

TABLE 7-continued

Table 103

|  | Reference Example 23 | Reference Example 24 | Reference Example 25 | Reference Comparative Example 9 | Reference Comparative Example 10 | Reference Comparative Example 11 | Reference Comparative Example 12 |
|---|---|---|---|---|---|---|---|
| Glass transition temperature (° C.) (heat resistance) | 94 | 92 | 100 | 135 | 143 | 59 | 59 |
| Thermoplasticity (press moldability) | ○ | ○ | ○ | Δ | Δ | ○ | ○ |
| Water absorption rate (%) | 0.65 | 0.76 | 0.74 | 2.6 | 3.1 | 1.5 | 1.6 |
| Plant component ratio (%) | 60 | 61 | 57 | 50 | 52 | 36 | 38 |

TABLE 8

Table 104

|  |  | Reference Example 26 | Reference Comparative Example 13 |
|---|---|---|---|
| Amount of cellulose | Mass fraction (%) | 24 | 24 |
| Amount of acetyl group | $DS_{Ace}$ | 0 | 2.1 |
|  | Mass fraction (%) | 0 | 13 |
| Amount of cardanol derivative | $DS_{CD}$ modified with monochloro acetic acid | 1.49 | 0 |
|  | Mass fraction (%) | 76 | 0 |
| Addition amount of plasticizer (% by mass) |  | 0 | 63 |
| Bending strength (MPa) |  | 25 | 9 |
| Bending elastic modulus (GPa) |  | 0.38 | 0.20 |
| Bend-breaking strain (%) |  | >10 | >10 |
| Tensile strength (MPa) |  | 17 | — |
| Tensile elastic modulus (GPa) |  | 0.26 | — |
| Tensile breaking strain (%) |  | 22 | — |
| Glass transition temperature (° C.) (heat resistance) |  | 84 | 21 |
| Thermoplasticity (press moldability) |  | ○ | ○ |
| Water absorption rate (%) |  | 1.9 | 4.0 |
| Plant component ratio (%) |  | 89 | 24 |

When Reference Examples 1 to 6 are compared to Reference Comparative Example 1, the cardanol-grafted cellulose resins (an acetyl group is also added to a cellulose hydroxy group) of the reference examples each had thermoplasticity (press moldability) and excellent bending properties without reducing a plant component ratio, and further tensile properties (particularly, breaking strain) and water resistance (water absorption rate) were improved, compared to the cellulose derivative (cellulose acetate) before grafting which had no thermoplasticity. Furthermore, when Reference Examples 1 to 6 are compared to Reference Comparative Examples 2 to 4, the cardanol-grafted cellulose resins (an acetyl group is also added to a cellulose hydroxy group) of the examples were more improved in bending properties, tensile properties and water resistance than the cellulose derivatives before grafting (cellulose acetate) which contained the plasticizer. In addition, high heat resistance (glass transition temperature) was obtained without reducing the plant component ratio.

As shown in Reference Examples 7 to 20, bending properties (particularly, bending strength) and tensile properties (particularly, tensile strength) can be even more improved while obtaining high water resistance by grafting with not only cardanol but also a reactive hydrocarbon.

In Reference Examples 21 and 22 and Reference Comparative Examples 6 to 8, compared to Reference Examples 1 to 20 and Reference Comparative Examples 1 to 5, the amount of acetyl group added to a cellulose hydroxy group is increased. Even in these case, when Reference Examples 21 and 22 are compared to Reference Comparative Example 6, the cardanol-grafted cellulose resins of the reference examples each had thermoplasticity and excellent bending properties without reducing a plant component ratio, and further tensile properties (particularly, breaking strain) and water resistance were improved, compared to the cellulose derivative before grafting which had no thermoplasticity. Furthermore, when Reference Examples 21 and 22 are compared to Reference Comparative Examples 7 and 8, the cardanol-grafted cellulose resins of the reference examples were more improved in bending properties (particularly, bending strength), tensile properties and water resistance than the cellulose derivatives before grafting which contained the plasticizer. In addition, high heat resistance was obtained without reducing the plant component ratio.

As shown in Reference Comparative Examples 2 to 4, 7 and 8 containing plasticizer, excellent heat resistance was not obtained by adding the plasticizer alone. According to the reference examples, not only thermoplasticity can be imparted to a cellulose resin but also excellent heat resistance can be obtained.

Furthermore, as shown in Reference Comparative Example 5 in which a reactive hydrocarbon alone was grafted, thermoplasticity was not obtained only by grafting a reactive hydrocarbon alone, and bending properties, tensile properties (particularly, breaking strain) and water resistance were not improved. According to the reference examples, not only thermoplasticity can be imparted to a cellulose resin but also excellent bending properties, tensile properties (particularly, breaking strain) and water resistance can be obtained.

Reference Examples 23 to 25 and Reference Comparative Examples 9 to 12, each are an example of a cellulose resin prepared by using a cellulose derivative having not only an acetyl group but also a butyryl group or a propionyl group added to a hydroxy group. Even in these case, when Reference Examples 23 to 25 are compared to Reference Comparative Examples 9 and 10, in the cardanol-grafted cellulose resins of the reference examples, excellent thermoplasticity and bending properties were obtained without reducing the plant component ratio, and further tensile properties (particularly breaking strain) and water resistance were improved, compared to the cellulose derivatives before grafting. Furthermore, when Reference Examples 23 to 25 and Reference Comparative Examples 11 and 12 are compared, the cardanol-grafted cellulose resins of the reference examples were more improved in bending properties (particularly, bending strength), tensile properties and water resistance than the cellulose derivatives before grafting which contained the plasticizer. In addition, high heat resistance was obtained without reducing the plant component ratio.

Reference Example 26 is an example of a cellulose resin prepared by using cellulose having a cellulose hydroxy group to which an acyl group such as an acetyl group is not added. Even in this case, when Reference Example 26 is compared to Reference Comparative Example 13, the cardanol-grafted cellulose resin of the reference examples was more improved in bending properties (particularly, bending strength), tensile properties and water resistance than the cellulose derivative of Reference Comparative Example 13, in which the cellulose derivative (cellulose acetate) contained a plasticizer (the weight ratio of the cellulose component is the same as the Reference Example 26). In addition, high heat resistance was obtained without reducing the plant component ratio.

As described above, according to the reference examples, it is possible to provide a cellulose resin improved in water resistance and having good thermoplasticity (press moldability) and sufficient heat resistance while maintaining a high plant component ratio (high vegetism). Furthermore, a press molded product having high bending properties can be obtained and a molded film can be improved in tensile properties (particularly, toughness). Furthermore, according to the reference examples, a grafted cellulose resin having a high plant component ratio as well as high utilization ratio of non-edible parts can be obtained.

While the present invention has been described with reference to the exemplary embodiments, the present invention is not limited to the above exemplary embodiments. Various changes that can be understood by those skilled in the art may be made to the constitution and details of the present invention within the scope thereof.

This application claims the right of priority based on Japanese Patent Application No. 2010-177953 filed Aug. 6, 2010 and the entire content of which is incorporated herein by reference.

The invention claimed is:

1. A cellulose resin produced by chemically bonding cardanol or a derivative thereof, and a flexible component to cellulose or a derivative thereof, wherein the flexible component comprises at least one selected from the group consisting of a reactive thermoplastic polyurethane elastomer, a reactive silicone and a reactive rubber.

2. The cellulose resin according to claim 1, wherein the flexible component comprises an isocyanate group, and
the flexible component is chemically bonded to the cellulose or a derivative thereof via a urethane bond formed by a reaction between the isocyanate group of the flexible component and a hydroxy group of the cellulose or a derivative thereof.

3. The cellulose resin according to claim 1, wherein the cardanol or a derivative thereof is chemically bonded to the cellulose or a derivative thereof by use of a phenolic hydroxy group of the cardanol or a derivative thereof and a hydroxyl group of the cellulose or a derivative thereof.

4. The cellulose resin according to claim 3, wherein a cellulose carbon atom to which the hydroxy group is chemically bonded and a cardanol carbon atom to which the phenolic hydroxy group is chemically bonded are linked via an organic linking group, and
the organic linking group comprises a first chemical bond to the cellulose carbon atom, the first bond being selected from the group consisting of an ester bond, an ether bond and a urethane bond, and a second chemical bond to the cardanol carbon atom, the second bond being selected from the group consisting of an ester bond, an ether bond and a urethane bond.

5. The cellulose resin according to claim 4, wherein the organic linking group further comprises a divalent hydrocarbon group having 1 to 20 carbon atoms.

6. The cellulose resin according to claim 1, wherein number $DS_{CD}$ of molecules of the cardanol or a derivative thereof added to the cellulose or a derivative thereof per glucose unit is 0.1 or more.

7. The cellulose resin according to claim 1, wherein, to a hydroxy group of the cellulose or a derivative thereof, a reactive hydrocarbon compound comprising a functional group capable of reacting with the hydroxy group is added.

8. The cellulose resin according to claim 7, wherein the reactive hydrocarbon compound is a hydrocarbon compound comprising a carboxyl group, a carboxylic halide group or a carboxylic acid anhydride group.

9. The cellulose resin according to claim 7, wherein the reactive hydrocarbon compound comprises at least one monocarboxylic acid, an acid halide thereof or acid anhydride thereof, the monocarboxylic acid being selected from the group consisting of an aliphatic carboxylic acid, an aromatic carboxylic acid and an alicyclic carboxylic acid.

10. The cellulose resin according to claim 7, wherein number $DS_{XX}$ of molecules of the reactive hydrocarbon compound added to the cellulose or a derivative thereof per glucose unit is 0.1 or more.

11. The cellulose resin according to claim 1, wherein at least one acyl group selected from the group consisting of an acetyl group, a propionyl group and a butyryl group is added to a cellulose hydroxy group.

12. The cellulose resin according to claim 1, wherein at least one first acyl group selected from the group consisting of an acetyl group, a propionyl group and a butyryl group is added to a cellulose hydroxy group, and a second acyl group derived from at least one monocarboxylic acid selected from the group consisting of an aromatic carboxylic acid and an alicyclic carboxylic acid is added to a cellulose hydroxy group.

13. The cellulose resin according to claim 1, wherein number $DS_{OH}$ of remaining hydroxy groups per glucose unit is 0.9 or less.

14. The cellulose resin according to claim 1, wherein a plant component ratio is 50% by mass or more, the ratio being defined as a ratio of a sum of cellulose moiety and cardanol moiety based on the total amount of the cellulose resin.

15. The cellulose resin according to claim 1, wherein the content of the flexible component is 0.5% by mass or more and 30% by mass or less, based on the total amount of the cellulose resin.

16. The cellulose resin according to claim 1, wherein an unsaturated bond of the cardanol or a derivative thereof is hydrogenated.

17. A resin composition comprising the cellulose resin as recited in claim 1 as a base resin.

18. A molding material comprising the resin composition as recited in claim 17.

19. The cellulose resin according to claim 12, wherein number $DS_{XX}$ of the second acyl groups added to the cellulose or a derivative thereof per glucose unit is 0.1 or more.

20. The cellulose resin according to claim 1, wherein the reactive thermoplastic polyurethane elastomer has an isocyanate group, and is formed using a polyol and a diisocyanate, the reactive thermoplastic polyurethane elastomer being chemically bonded to cellulose or a derivative thereof via a urethane bond formed through a reaction between the isocyanate group and a hydroxy group of the cellulose or a derivative thereof;
the reactive silicone comprises a main silicone skeleton and functional group A1 capable of reacting with a hydroxy group of cellulose, the functional group A1 including an isocyanate group or a carboxylic halide group, the reactive silicone being chemically bonded to cellulose or a derivative thereof via a bond formed through a reaction between functional group A1 and a hydroxy group of the cellulose or a derivative thereof; and the reactive rubber is a rubber having a functional group A2 capable of reacting with a hydroxy group of cellulose, the functional group A2 including an epoxy group, a carboxyl group, an acid chloride group or an isocyanate group, the reactive rubber being chemically bonded to cellulose or a derivative thereof via a chemical bond formed through a reaction between the functional group A2 and a hydroxy group of the cellulose or a derivative thereof.

21. The cellulose resin according to claim 20, wherein the reactive silicone is a compound formed by reacting a multifunctional compound having a functional group A1 and a functional group B with a modified silicone having a functional group C capable of reacting with functional group B, the functional group B is selected from a carboxyl group, a carboxylic halide group and an isocyanate group, and the functional group C is selected from an amino group, an epoxy group, a hydroxy group and a carboxyl group.

22. The cellulose resin according to claim 21, wherein the modified silicone is a modified polydimethylsiloxane comprising a main chain composed of dimethyl siloxane repeat units in which a part of methyl groups of a side-chain or terminal is substituted with a group containing reactive functional group C.

23. The cellulose resin according to claim 11, wherein number $DS_{AC}$ of the acyl groups added to the cellulose or a derivative thereof per glucose unit is 0.5 to 2.7.

24. The cellulose resin according to claim 11, wherein number $DS_{AC}$ of the acyl groups added to the cellulose or a derivative thereof per glucose unit is 1.5 to 2.7.

* * * * *